US007944862B2

(12) United States Patent  
Taylor et al.

(10) Patent No.: US 7,944,862 B2  
(45) Date of Patent: May 17, 2011

(54) ACCELERATED SESSION ESTABLISHMENT IN A MULTIMEDIA GATEWAY

(75) Inventors: Nathan Taylor, Petaluma, CA (US); David Jack, Glos (GB); Mario Sammut, Collaroy (AU); Marwan A. Jabri, Tiburon, CA (US); Brody Kenrick, San Francisco, CA (US)

(73) Assignee: Onmobile Global Limited (IN)

( * ) Notice: Subject to any disclaimer, the term of this patent is extended or adjusted under 35 U.S.C. 154(b) by 864 days.

(21) Appl. No.: 11/557,725

(22) Filed: Nov. 8, 2006

(65) Prior Publication Data

US 2007/0297339 A1 Dec. 27, 2007

Related U.S. Application Data

(60) Provisional application No. 60/735,270, filed on Nov. 9, 2005.

(51) Int. Cl.  
*H04L 12/16* (2006.01)

(52) U.S. Cl. ......... 370/261; 370/352; 370/401; 370/410

(58) Field of Classification Search .................. 370/238, 370/235, 260, 262, 352, 401, 410; 709/224–228, 709/231  
See application file for complete search history.

(56) References Cited

U.S. PATENT DOCUMENTS

| | | | |
|---|---|---|---|
| 6,954,800 B2 | 10/2005 | Mallory | |
| 2004/0076145 A1* | 4/2004 | Kauhanen et al. | 370/352 |
| 2004/0125760 A1 | 7/2004 | Newberg et al. | |
| 2004/0131042 A1 | 7/2004 | Lillie et al. | |
| 2004/0174817 A1* | 9/2004 | Jabri et al. | 370/238 |
| 2004/0176032 A1 | 9/2004 | Kotola et al. | |
| 2004/0252761 A1* | 12/2004 | Brown et al. | 375/240.12 |
| 2005/0008240 A1* | 1/2005 | Banerji et al. | 382/238 |
| 2005/0193420 A1* | 9/2005 | Hocevar et al. | 725/80 |
| 2005/0239498 A1 | 10/2005 | Dorenbosch et al. | |
| 2006/0294245 A1* | 12/2006 | Raguparan et al. | 709/227 |

OTHER PUBLICATIONS

PCT International Search Report and Written Opinion of PCT Application No. PCT/US06/43685, dated Dec. 19, 2007, 16 pages.  
Preliminary Report Patent on Patentability for PCT/US2006/043685 mailed on Apr. 2, 2009; 11 pages.

* cited by examiner

*Primary Examiner* — Jung Park  
(74) *Attorney, Agent, or Firm* — Hoffmann & Baron, LLP

(57) ABSTRACT

In one aspect, a method of establishing a reduced setup time session through a gateway is provided which includes: receiving a first capability message transmitted from the first terminal to the gateway; receiving a second capability message transmitted from the second terminal to the gateway; transmitting first and second capability response messages from the terminal to the first and second terminals, respectively; receiving a media stream transmitted from the second terminal to the gateway; processing the media stream, including identifying a temporal feature in the media stream that enables a decoder to establish a decoder refresh point; receiving an acknowledgment message transmitted from the first terminal to the gateway; and, thereafter transmitting the processed media from the gateway to the first terminal.

33 Claims, 22 Drawing Sheets

ACCELERATED SESSION ESTABLISHMENT IN A MULTIMEDIA GATEWAY

CROSS-REFERENCES TO RELATED APPLICATIONS

This application claims priority to U.S. Provisional Patent Application No. 60/735,270, filed Nov. 9, 2005, the specification of which is incorporated by reference herein in its entirety.

BACKGROUND OF THE INVENTION

The present invention relates generally to the field of telecommunications. More particularly, the present invention relates to a method and apparatus for establishing sessions for Third Generation (3G) digital communications. Merely by way of example, the invention has been applied to a performing accelerated session setup for terminals communicating through a gateway, but it would be recognized that the invention may also include other applications.

Third Generation mobile networks allow their users access to a rich complement of multimedia services including audio, video, and data. The Third Generation Partnership Project (3GPP) is an industry consortium formed to advance the technology and acceptance of 3G mobile networks. The 3GPP has defined the 3G-324M Technical Specification that defines how terminals and the network interoperate in order to provide advanced services. Additionally, the Third Generation Partnership Project 2 (3GPP2) has adopted the 3G-324M Technical Specification.

The 3G-324M Technical Specification is based on the ITU-T (International Telecommunication Union, Standardization Section) H.324 Recommendation, that is, 3G-324M can be seen as a specific configuration of the H.324 Recommendation of the ITU-T. Other H.324-like terminals exist, such as H.324M terminals.

The 3GPP 3G-324M recommendations use and extend H.324 as follows:
1. The use of the ITU-T H.324 umbrella recommendation and its Annex C. This defines the overall videotelephony service, including H.223 and H.245.
2. The use of Annexes A and B of H.223 ITU-T.
3. The use of the mobile messaging facilities of H.245.
4. The use of specific audio and video codecs. For example, the GSM-AMR audio codec and the H.263 video codec are recommended. Other audio and video codecs are proposed as options.

The 3GPP has defined a phased network evolution and has defined specifications for "Release 99", "Release 5," and "Release 6" networks in a logical network migration. Most mobile networks today use circuit switched interfaces and protocols (e.g., ISDN, ISUP, and TDM DS0s) in order to connect to fixed network telephony subscribers.

In a 3G-324M environment, interaction between terminal endpoints and the intervening network can be classified into three areas: call signaling, session signaling, and media exchange.

Call signaling is used to set up the bearer channel between endpoints. In 3G-324M, the bearer channel is typically a 64 Kb/sec channel.

Session signaling is used to define the framing used on the bearer channel, to negotiate media options, to create, identify, and control the operation of "logical channels" (which carry the media) within the multiplexed frames on the bearer, and to communicate control information between endpoints (such as the carriage of user key-presses).

3 G operators and service providers may offer their videotelephony subscribers equipped with 3G-324M terminals access to enhanced services (such as videoconferencing and videomail). They may also offer the subscribers the option of reaching users on other networks (such as the public internet or corporate, private, or another company's packet networks) and to establish with them videotelephony and conferencing sessions. In order to offer such services, the operators and services providers need to equip their networks with gateways that can provide protocol translation between the 3G terminals (e.g., 3G-324M) and the protocols of the services and/or users in the other networks. For example one protocol for multimedia communication that is used on the packet networks (e.g., public internet or corporate packet networks) is the ITU-T H.323 protocol. Another example protocol is the IETF (Internet Engineering Task Force) Session Initiation Protocol. Both H.323 and SIP are widely used as protocols for user or service connectivity in packet networks. There are variants on H.323 and SIP, that we call H.323-like and SIP-like, respectively.

The translation of protocols between 3G-324M terminals and H.323 or SIP terminals or services is typically done by a gateway function. The gateway converts the protocols including signaling, session establishment, media, as well as transport between circuit and packets.

During the 3G-324M and H.323 session setup phase, Session Signaling is used by both endpoints to advertise their Terminal Capabilities, to arbitrate for Master or Slave (which determines other protocol behaviors later), to add individual Multiplexer Table Entries and to open Logical Channels. In a videotelephony application, two Logical Channels are typically opened in each direction: one for audio data and one for video data. Note that a Session Setup sequence in this case requires six or eight round trip messages.

Once a session is set up, Session Signaling is used by 3G-324M and H.323 endpoints to communicate out of band control information, such as the transport of DTMF digits (by the "User Input Indication" message).

In the case of SIP, the number of round trip messages to perform the same functions is reduced, albeit at the loss of some flexibility. Although most SIP terminals use a different technique for transporting DTMF digits (they are sent inband in the media stream), SIP has the notion of transporting out of band control information (by the INFO method).

Importantly, for Session Signaling protocols commonly used by multimedia devices today (e.g., 3G-324M, H.323, and SIP), there are two important parts of the session setup for media: media negotiation and a media establishment.

An implementation of GSS functionality is denoted a "Full Proxy GSS," if it faithfully and immediately relays requests and responses from one terminal to the other.

A Full Proxy GSS is straightforward to implement, as there is often a trivial mapping between messages from one network to messages in the other. As an example, both 3G-324M/H.324 and H.323 specify the use of the H.245 protocol at the session signaling layer.

A Full Proxy GSS converts messages received by one call half into an equivalent message (of the destination terminal protocol) for the other call half, with typically only some necessary modifications. As an example, if a request is made by an endpoint to open or close a logical channel, this request is immediately sent to the other endpoint: in effect, the Full Proxy GSS acts largely as an intelligent message translator/forwarder, and its operations are driven by the actions of the endpoints.

FIG. 1 is a simplified diagram illustrating a conventional call setup procedure between an H.324 device and an H.323 device using a proxy gateway. As illustrated in FIG. 1, call setup through a proxying gateway involves propagation of messages through the gateway from one terminal to the other with the minimal modifications needed for compatibility. The acknowledged messages incur a roundtrip delay on both sides of the gateway leading to a substantial slow down of the session setup for both terminals as compared to the time it would take for a session to be established to a like terminal.

Further, the session setup including media is further delayed by the propagation where the media is not transmitted from the H.323 device until after receipt of the OLCs Ack from the H.3245 device via the proxying gateway. Similarly media is not transmitted from the H.324 device until after receipt of the OLCs Ack from the H.323 device via the proxying gateway. As a result, a caller experiences long delays between the initial call setup messages and the delivery of media.

As mentioned with regard to the Full Proxy GSS and observed in FIG. 1, there are many similarities between the H.324 and H.323 protocols, in particular their use of the H.245 control protocol. For this reason, the two protocols are sometimes referred to as H.32X protocols.

Interworking between 3G-324M and a SIP network is somewhat more elaborate than interworking between 3G-324M and H.323, as SIP and RTSP use SDP instead of H.245 to communicate media options. There are several different flavors of SDP, so for purposes of simplicity, we may refer to them as SDP-like. However, the necessary mappings are readily available.

The apparent simplicity of the Full Proxy GSS comes with a cost. In order to accurately track the session state, the Full Proxy GSS must in some cases have detailed knowledge of the concrete protocols used by the call halves, and must often duplicate state and logic that is present in the concrete protocol implementations. In addition, since the Full Proxy GSS must track the session state of the underlying protocols, the state machines in the Full Proxy GSS may often be as complicated as the state machines of the underlying concrete protocols. Also, the Full Proxy GSS is substantially slower to set up a call than would be the case for either of devices attached if they were directly connected to peers in the same network, due to the propagation of messages and acknowledgements through both networks.

Thus, there is a need in the art for improved methods and systems for accelerated call setup in telecommunications applications through gateways.

SUMMARY OF THE INVENTION

According to the present invention, techniques related to the field of telecommunications are provided. More particularly, the present invention relates to a method and apparatus for establishing sessions for Third Generation (3G) digital communications. Merely by way of example, the invention has been applied to a performing accelerated session setup for terminals communicating through a gateway, but it would be recognized that the invention may also include other applications.

According to an embodiment of the present invention, a method of establishing a reduced setup time session through a gateway is provided. The session is conducted between a first terminal operating under a first protocol and a second terminal operating under a second protocol. The method includes receiving a first capability message transmitted from the first terminal to the gateway and receiving a second capability message transmitted from the second terminal to the gateway. The method also includes processing the first capability message and the second capability message to form a third capability message associated with the first capability message and a fourth capability message associated with the second capability message. The method further includes transmitting a third capability message from the gateway to the first terminal, transmitting a fourth capability message from the gateway to the second terminal, and receiving a first request message transmitted from the second terminal to the gateway. The first request message is related to a process for opening a second media channel adapted to support a transmission of a second media stream from the second terminal to the gateway. Additionally, the method includes transmitting a second request message from the gateway to the first terminal. The second request message is related to a process for opening a first media channel adapted to support a transmission of a first media stream from the gateway to the first terminal. Furthermore, transmitting the second request message is performed independent of receiving the first request message. Moreover, the method includes receiving a first response message transmitted from the second terminal to the gateway. The first response message is related to the process for opening the second media channel. The method also includes transmitting a second response message from the gateway to the first terminal. Transmitting the second response message is performed in response to receiving the first response message.

According to another embodiment of the present invention, a method of establishing a reduced setup time session through a gateway is provided. The session is conducted between a first terminal operating under a first protocol and a second terminal operating under a second protocol. The method includes receiving a first capability message transmitted from the first terminal to the gateway, receiving a second capability message transmitted from the second terminal to the gateway, processing the first capability message and the second capability message to form a third capability message, and processing the first capability message and the second capability message to form a fourth capability message. The method also includes transmitting the third capability message from the gateway to the first terminal and transmitting the fourth capability message from the gateway to the second terminal. The method further includes receiving a first request message transmitted from the second terminal to the gateway. The first request message is related to a process for opening a second media channel adapted to support a transmission of a second media stream from the second terminal to the gateway. Additionally, the method includes transmitting a second request message from the gateway to the first terminal. The second request message is related to a process for opening a first media channel adapted to support a transmission of a first media stream from the gateway to the first terminal and transmitting the second request message is performed independent of receiving the first request message. Moreover, the method includes receiving a first response message transmitted from the second terminal to the gateway. The first response message is related to the process for opening the second media channel. The method also includes transmitting a second response message from the gateway to the first terminal. Transmitting the second response message is performed independent of receiving the first response message.

According to an alternative embodiment of the present invention, a method of establishing a communication session through a gateway is provided. The communication session is conducted between a first terminal and a second terminal. The method includes performing a first capability negotiation process with the first terminal and performing a second capability negotiation process with the second terminal. The second capability negotiation process is performed independent of the first capability negotiation process. The method also includes receiving a media stream transmitted from the second terminal, processing the media stream, providing a first temporal feature that enables a decoder to establish a decoder refresh point, and thereafter, transmitting the first temporal feature and the processed media stream to the first terminal.

According to another alternative embodiment of the present invention, a method of establishing a reduced setup time session between an H.32X-like terminal and a gateway is provided. The session operates under a predetermined protocol. The method includes receiving a second capability message transmitted from a second terminal to the gateway, receiving a first capability message transmitted from the H.32X-like terminal to the gateway, and processing the first capability message to form a third capability message associated with the first capability message. The method also includes transmitting the third capability message from the gateway to the H.32X-like terminal after receiving the first capability message transmitted from the H.32X-like terminal and receiving the second capability message transmitted from the second terminal to the gateway. The method further includes transmitting a request message from the gateway to the H.32X-like terminal. The request message is related to a process for opening a media channel between the gateway and the H.32X-like terminal. Moreover, transmitting the request message is performed independent of the capability negotiation process between the gateway and the second terminal. Additionally, the method includes receiving a response message transmitted from the H.32X-like terminal to the gateway. The response message is related to the process for opening the media channel. The method also includes receiving a media stream transmitted from the H.32X-like terminal to the gateway using the media channel and transmitting the media stream from the gateway to the second terminal.

According to a specific embodiment of the present invention, a method of establishing a reduced setup time session between an H.324-like terminal and a gateway is provided. The session operates under a predetermined protocol. The method includes receiving a first capability message transmitted from the H.324-like terminal to the gateway, receiving a second capability message transmitted from a second terminal to the gateway, and processing the first capability message and the second capability message to form a third capability message. The method also includes transmitting the third capability message from the gateway to the H.324-like terminal and transmitting a first enablement message from the gateway to the second terminal. The first enablement message is related to media transmission enablement for a first media stream from the second terminal to the gateway, The first enablement message is transmitted prior to receiving a second enablement message from the first terminal at the gateway. The second enablement message is related to media transmission enablement for a second media stream from the gateway to the first device. Moreover, the method includes receiving the first media stream at the gateway, processing the first media stream at the gateway to provide a processed media stream, and transmitting the processed media stream as the second media stream from the gateway.

According to another specific embodiment of the present invention, a method of establishing a reduced setup time session between a first SIP-like terminal and a second SIP-like terminal is provided. The session is conducted between the first SIP-like terminal and the second SIP-like terminal through a gateway. The method includes receiving a first call setup message transmitted from the first SIP-like terminal to the gateway. The first call setup message includes a first capability message. The method also includes transmitting a second call setup message from the gateway to the second SIP-like terminal, receiving a second capability message transmitted from the second SIP-like terminal to the gateway, and transmitting a first capability response message from the gateway to the first SIP-like terminal. The method further includes transmitting a second capability response message from the gateway to the second SIP-like terminal, receiving a media stream transmitted from the second SIP-like terminal to the gateway, processing the media stream, and receiving an acknowledgment message transmitted from the first SIP-like terminal to the gateway. The acknowledgement message is received at the gateway after transmitting the second capability response message. Moreover, the method includes thereafter, transmitting the processed media stream from the gateway to the first SIP-like terminal.

According to yet another specific embodiment of the present invention, a method of establishing a reduced setup time session between a first SIP-like terminal and a second SIP-like terminal is provided. The session is conducted through gateway. The method includes performing a first session setup process between the first terminal and the gateway and performing a second session setup process between the second terminal and the gateway. The second session setup process is performed independent of the first session setup process. The method also includes receiving a media stream transmitted from the second SIP-like terminal to the gateway, processing the first media stream, and providing an intra-coded frame. The method further includes thereafter, transmitting the intra-coded frame and the processed media stream from the gateway to the first SIP-like terminal.

Numerous benefits are achieved using embodiments of the present invention in contrast with conventional techniques. For example, in an embodiment according to the present invention, benefits are provided in the context of 3G Videotelephony services using 3G-324M and a Multimedia Gateway (MMGW), as the decoupling of the Session Signaling on either leg of the connection (3G-324M/MMGW and MMGW/SIP or MMGW/H.323 or MMGW/RTSP) permits either side of the MMGW to proceed with its session setup as fast as possible. The 3G-324M Session Signaling may involve a number of sequential protocol message exchanges, and the decoupling permits the protocol procedures to proceed at their highest speed without being held-up unnecessarily by exchanges or messages on the other-side, and viseversa. This is in contrast with a "proxy" approach where protocol messages transmitted by one end-point are received and translated to the equivalent target protocol and transmitted by the MMGW to the other terminal (which could be a handset or a server).

In embodiments utilizing a Decoupled GSS Architecture, session setup delays are reduced or minimized and isolation is provided between implementations of the concrete protocols. This reduces the overall complexity of the implementation and creates a framework whereby additional network features and interfaces can be added easily.

Depending upon the embodiment, one or more of these benefits may exist. These and other benefits have been described throughout the present specification and more particularly below. Various additional objects, features and advantages of the present invention can be more fully appreciated with reference to the detailed description and accompanying drawings that follow.

DETAILED DESCRIPTION OF SPECIFIC EMBODIMENTS

Figure 1:
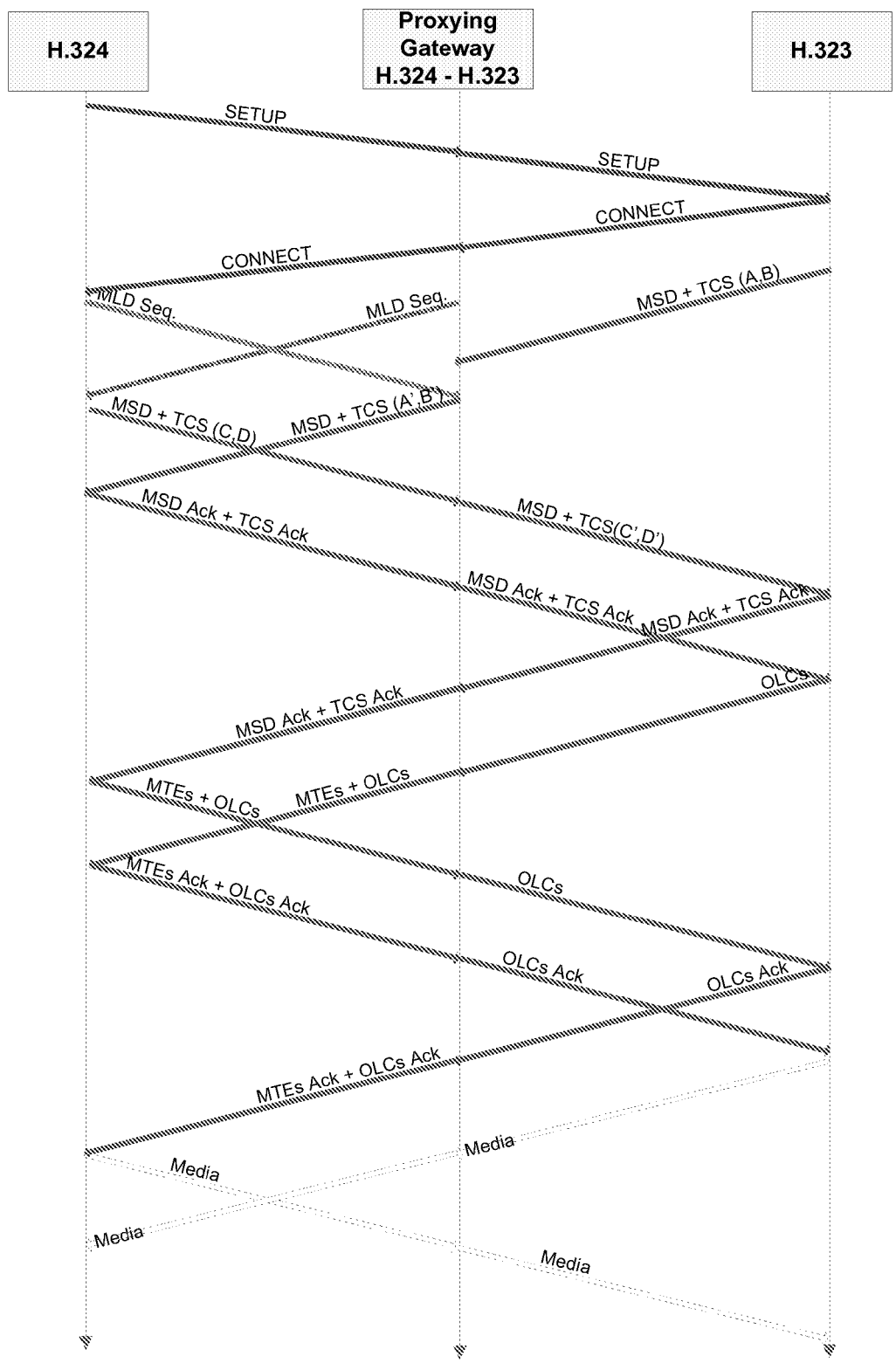
FIG. 1 is a simplified diagram illustrating a conventional call setup procedure between an H.324 device and an H.323 device using a proxy gateway.

According to an embodiment of the present invention, a method and apparatus for providing decoupled gateway session signaling is provided. More particularly, the present invention relates to a method and apparatus for establishing sessions for Third Generation (3G) digital communications. Merely by way of example, the invention has been applied to a performing accelerated session setup for terminals communicating through a gateway, but it would be recognized that Embodiments of the present invention relate to the signaling and session establishment parts of the gateway function. Note that although we mention a gateway function, the function may be implemented in a stand-alone system or can be part of another system. We will call such a function the Multimedia Gateway (MMGW).

Call Signaling functions are an optional function of the MMGW. Call Signaling might also be performed as a function of a MMGW, typically called Media Gateway Controller (MGC) function. The MGC function may be implemented as a stand-alone system or may be part of another system. An interface typically exists between the MGC and the MMGW to communicate results of the call signaling phase of the call. The typical protocols used at this interface are MGCP and H.248/Megaco. As embodiments of the present invention relate to the session signaling function in the MMGW, it is immaterial whether the call signaling function is integral to the MMGW, and so it is assumed with no loss of generality that this is the case.

The MMGW connects at the network boundary for two separate networks, and terminates the call and session signaling for the two networks. When an inter-network call is established, the MMGW terminates both call and session signaling from the originating endpoint. To progress the call to its final destination endpoint, the MMGW originates both call and session signaling in the destination network. It is convenient to refer to the two legs of the connection (originating endpoint to MMGW, and MMGW to destination endpoint) as "half calls."

An important example of 3G-324M interworking is between a videotelephony user (using a video enabled mobile handset) on a mobile network and a videotelephony user in the packet (e.g., Internet) network, using H.323 or SIP.

The interfaces at the 3G-324M network boundary are usually ISDN or ISUP for call signaling, H.245/3G-324M for session signaling, H.223 for the multiplexer layer on the bearer channel, and within the multiplexed frames the media and/or data bitstream chunks.

The interfaces at the network boundary of an H.323 packet network are usually H.225.0 and Q.931 for call signaling, H.245/H.323 for session signaling. RTP is used for media payload encapsulation, packet tracking, and synchronization.

The interface at the network boundary of a SIP based packet network use SIP for call signaling. The media negotiation is typically performed using an SDP-like protocol, and the media and data are transmitted using RTP or a variation of RTP (RTP-like).

There are other networks of interest. For example, ISDN networks as specified in ITU-T Recommendation H.320 have been in use for many years. Also less media rich networks such as the Public Switched Telephone Network (PSTN) and voice only GSM or CDMA (IS-95) networks are capable of service enhancement when connecting through a gateway. It is further expected that additional networks may appear over time, such as the Next Generation Networks (NGN) such as ITU-T H.325. As before, internetworking is required to allow users of these diverse networks access to users in other networks, and similar comments and considerations apply.

There are also other services of interest, for example the provision of content streaming services to 3G-324M subscriber. In this context, the 3G user dials a content provision service such as movie clips or mature content. The access of the service on the 3G side would be through the 3G-324M bearer. The Multimedia Gateway would terminate the call and acts as a mediator with a content access server through a protocol such as the Real Time Streaming Protocol (RTSP and RTSP2) which is a protocol with similarities to SIP on the packet side.

Figure 2:
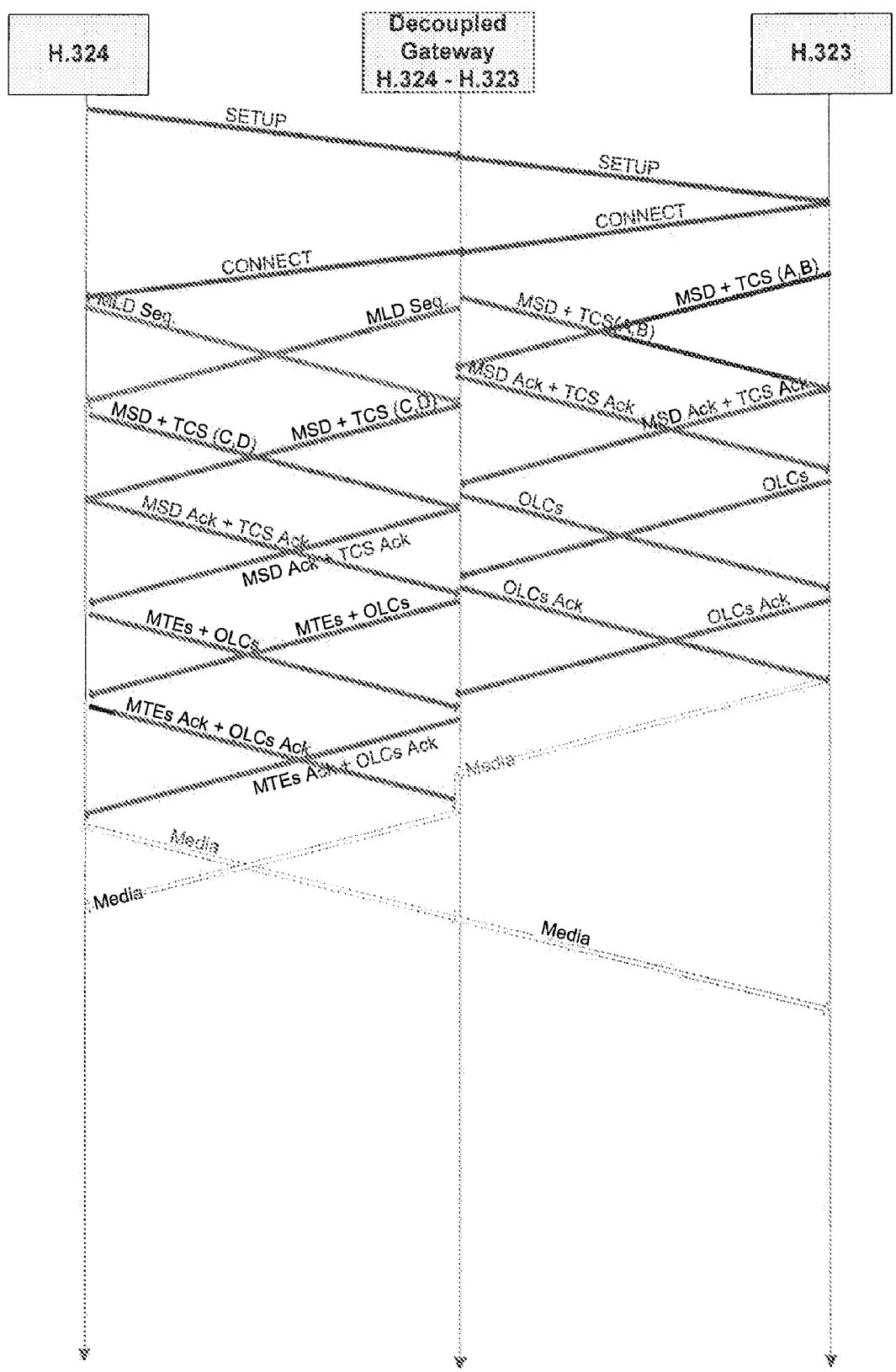
FIG. 2 is a simplified diagram illustrating a call setup procedure between an H.324-like device and an H.323-like device using a fully decoupled gateway according to an embodiment of the present invention.

FIG. 2 is a simplified diagram illustrating a call setup procedure between an H.324-like device and an H.323-like device using a fully decoupled gateway according to an embodiment of the present invention. As illustrated in FIG. 2, the setup operations for the H.324 and H.323 devices are decoupled, each side of the gateway negotiates its session independently from the other side. This system delivers quick session setup by utilizing several procedures to ensure media compatibility as well as various other capabilities, such as adaptation layer, and bit rate as well as media free of corruption.

In an embodiment of the present invention, a method of establishing a communication session through a gateway is provided. The communication session is conducted between a first terminal and a second terminal. Merely by way of example, the first terminal may be an H.324-like terminal (e.g., a 3G-324M handset) and the second terminal may be an H.323-like terminal.

The method includes performing a first capability negotiation process with the first terminal and performing a second capability negotiation process with the second terminal. The second capability negotiation process is performed independent of the first capability negotiation process. As an example, the first capability negotiation process may include the transmission of a first terminal capability set message from the gateway to the first terminal and the second capability negotiation process may include the transmission of a second terminal capability set message from the gateway to the second terminal.

The method also includes receiving a media stream transmitted from the second terminal, processing the media stream, providing a first temporal feature that enables a decoder to establish a decoder refresh point, and thereafter, transmitting the temporal feature and the processed media stream to the first terminal.

According to an embodiment, processing the media stream includes identifying a second temporal feature in the media stream that enables a decoder to establish a decoder refresh point. The second temporal feature may be an intra-coded frame. In another embodiment, processing the media steam further includes generating a VideoFastUpdate, or a similar VideoFastUpdate-like message, and transmitting the VideoFastUpdate or VideoFastUpdate-like message from the gateway to the second terminal. In yet another embodiment, the first temporal feature is an intra-coded frame, generated, for example, by converting an inter-coded frame into an intra-coded frame at the gateway. Alternatively, the first temporal feature may be an intra-coded frame provide by a video transcoder.

In a particular embodiment, processing the media stream includes identifying a second temporal feature in the media stream that enables a decoder to establish a decoder refresh point. For example, the second temporal feature may be an intra-coded frame.

In a specific embodiment, the first capability negotiation process includes the transmission of a first terminal capability set message from the gateway to the first terminal and the second capability negotiation process includes the transmission of a second terminal capability set message from the gateway to the second terminal. The first terminal may be an H.324-like terminal (e.g., a 3G-324M handset) and the second terminal may be an H.323-like terminal.

It should be appreciated that the specific steps illustrated in FIG. 2 provide a particular method of establishing a communication session through a gateway according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Media, or codec, compatibility can be achieved on each side in a number of ways. A simple way that will limit the ability of handsets to utilize their best quality media codecs is to restrain to a single mandatory codec, or single supported codec, for outgoing capabilities from the gateway, regardless of the terminals abilities, including any additional common non-mandatory codec abilities. This will provide a mode of operation in which only a single codec can be selected, for example H.263 video on both sides allowing media pass through. If incompatible codecs are mandated on the two sides, the introduction of a single transcoder will allow this method to continue to work. For example, G.723.1 on H.323 and GSM-AMR on the H.324 (3G-324M) side could be joined by introducing a transcoder between GSM-AMR and G.723.1. In an embodiment, a pair of unidirectional transcoders are utilized. Such a transcoder is shown in commonly assigned U.S. Pat. No. 6,829,579, issued on Dec. 7, 2004, which is incorporated by reference in its entirety for all purposes. Alternatively, the transcoder may be a simple tandem transcoder made up of a decoder and an encoder.

Media, or codec, compatibility can further be ensured by introducing multiple transcoders between many codec types. By way of example, further transcoders are described more fully in commonly assigned and co-pending U.S. patent application Ser. No. 10/620,329, filed on Jul. 14, 2003, which is incorporated by reference in its entirety for all purposes. A system for incorporating transcoders is described in commonly assigned and co-pending U.S. patent application Ser. No. 10/099,901, filed on Mar. 12, 2002, which is incorporated by reference in its entirety for all purposes. The introduction of additional transcoders allows for the decoupled advertising and negotiation of all codecs that are fully supported in the mesh of transcoders supported in the gateway. As terminal capabilities and codec capabilities increase however, the burden on the gateway system increases with each new codec added as shown in Table 1.

TABLE 1

Examples of transcoders utilized for advertised capabilities

| A terminal | B terminal | Gateway support |
| --- | --- | --- |
| H.263 | H.263 | H.263 to H.263 |
| H.263 | MP4-Visual | H.263 to MP4-Visual |
|  |  | MP4-Visual to H.263 |
| H.263 | H.263 | H.263 to H.263 |
|  | MP4-Visual | H.263 to MP4-Visual |
|  |  | MP4-Visual to H.263 |
| H.263 | H.263 | H.263 to H.263 |
| H.264 | MP4-Visual | H.263 to H.264 |
|  |  | H.263 to MP4-Visual |
|  |  | H.264 to H.263 |
|  |  | H.264 to MP4-Visual |
|  |  | MP4-Visual to H.263 |
|  |  | MP4-Visual to H.264 |
| H.263 | H.263 | H.263 to H.263 |
| H.264 | H.264 | H.263 to H.264 |
| MP4-Visual | MP4-Visual | H.263 to MP4-Visual |
|  |  | H.264 to H.263 |
|  |  | H.264 to H.264 |
|  |  | H.264 to MP4-Visual |
|  |  | MP4-Visual to H.263 |
|  |  | MP4-Visual to H.264 |
|  |  | MP4-Visual to MP4-Visual |
| H.261 | H.261 | 25 video transcoders |
| H.263 | H.263 |  |
| H.264 | H.264 |  |
| H.265 | H.265 |  |
| MP4-Visual | MP4-Visual |  |

Decoupled negotiation generally also requires special procedures for the media to ensure the quality of the media is maintained, especially for temporally coded media such as video with its intra coded frames. If media is allowed to flow on one side of the gateway before the other side is ready to receive it, then at the time the terminal becomes ready to receive media, the gateway will be mid-stream between two temporal decoder refresh points. The gateway could simply begin passing media through to the other side, but this will very likely result in corrupted media being displayed on the decoding terminal, which may prove unacceptable to users of a service employing such a technique.

Some alternatives exist for this problem the first of which uses a "wait for feature then let through" approach. Here, a minimal decoder, or simple bitstream recognizer, inspects the media and determines if a decoder refresh point is available. For some codecs, this might be by searching for picture start code and finding a picture coding type. This can be done directly on the bitstream, or even on the adapted or multiplexed media stream to reduce the need for as many resources in the system. Also, other packaging features such as RTP headers may be used to identify the start of a refresh frame. After the refresh point is determined, the refresh point and all following media can simply be passed through the other side, or can be transcoded for the other side. This feature may be located in a transcoder, or a full decoder.

The approach described above may suffer from a lengthy, possibly indefinite, delay as the feature is waited upon in the media stream. To avoid this delay, it is possible for the gateway to force the generation of the feature at the terminal by transmitting a picture video fast update request, such as an H.245 VideoFastUpdate-like message, then following the wait method.

The approach described above may still suffer from a substantial delay (around a round trip even when successful), and if a terminal is incapable of transmitting a refresh feature, if for example it is delivering pre-encoded media, then a VideoFastUpdate-like (VFU) request will not generally be effective in expediting the feature delivery.

A feature to create local dynamic generation of decoder refresh points in a transcoder is described more fully in commonly assigned and co-pending U.S. patent application Ser. No. 10/762,829, filed on Jan. 21, 2004, which is incorporated by reference in its entirety for all purposes. The application discusses a case of handling video errors in an active media stream. Here this feature is extended to a gateway situation with quality of the initial media transmitted to a participant and the decoder refresh point feature is used to allow media to flow from one side to the gateway before the other side is capable of receiving it. When the other side notifies the gateway it is capable of receiving media, the feature is generated. The media may be delivered along with other necessary details to start a media session, such as decoder configuration information (DCI) or parameter sets. In the case of a decoupled call setup, as soon as media arrives, and regardless of if the other side is ready to receive it, the media is being decoded, or buffered back to a last known good decode point such as the last decoder refresh point, and as soon as the receiving side becomes ready, a decoder refresh point can be immediately transmitted to the receiving terminal. This provides an extremely fast set up for overall media. This is shown for the media flowing from H.323 to H.324 in FIG. 2.

Once the gateway receives media from H.323, the media is buffered or decoded or transcoded. When the H.324 device is ready (OLC Ack received), then an I-frame is generated at the decoupled gateway and the media including the I-frame is transmitted from the gateway to the H.324. A benefit of methods as described herein is that rather than propagating a message to the H.323 device (e.g., an OLC Ack) before media is transmitted from the gateway, the media is transmitted from the gateway to the H.324 device upon receipt of the OLCs Ack from the H.324 device. Thus, there is no media delay as would be incurred if transmission of media was delayed until after the OLCs Ack was transmitted from the gateway to the H.323 device.

Figure 3:
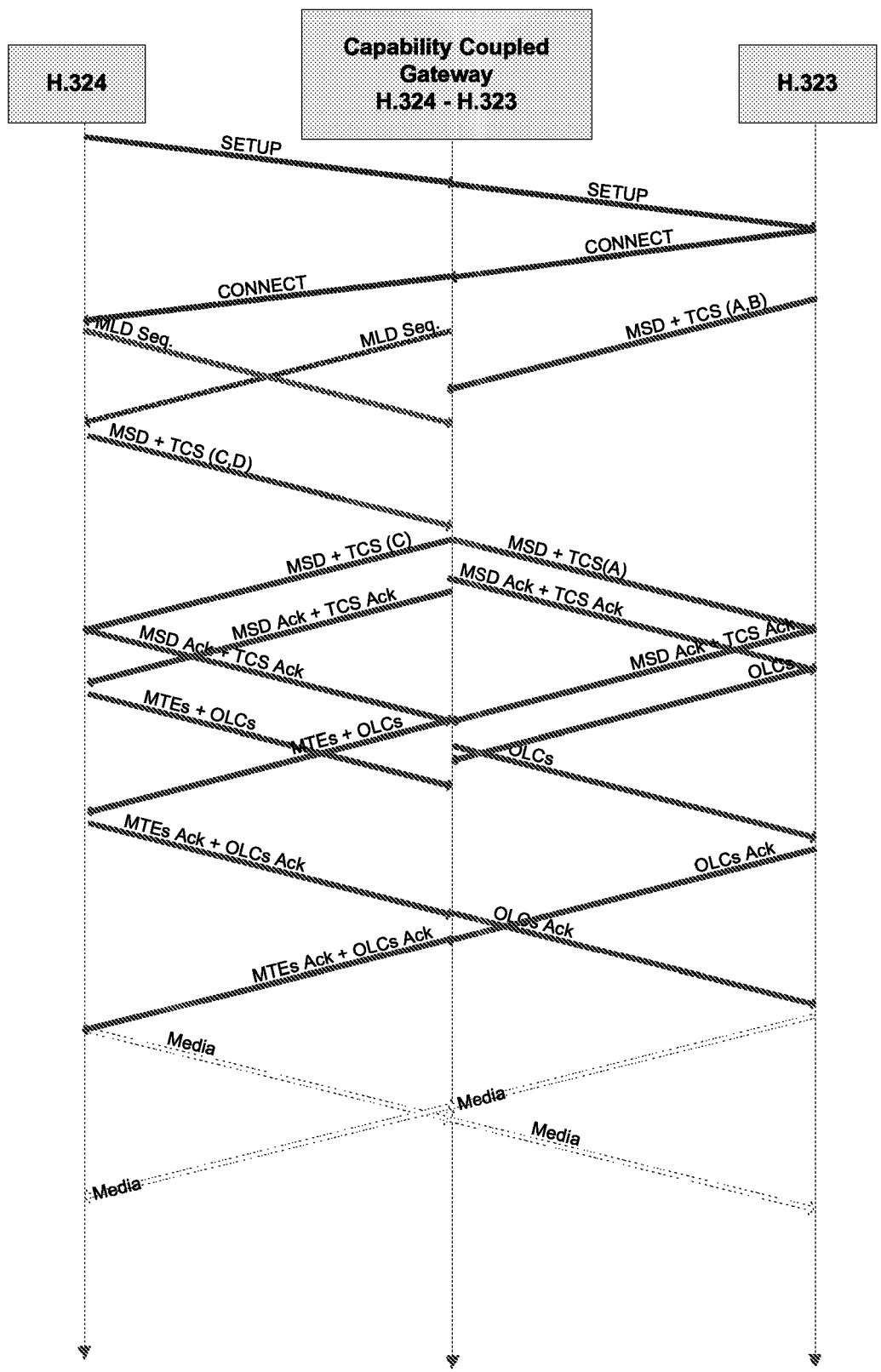
FIG. 3 is a simplified diagram illustrating a call setup procedure between an H.324-like device and an H.323-like device using a capability coupled gateway according to an embodiment of the present invention.

FIG. 3 is a simplified diagram illustrating a call setup procedure between an H.324-like device and an H.323-like device using a capability coupled gateway according to an embodiment of the present invention. In the embodiment illustrated in FIG. 3, the capabilities in the TCS are selectively restricted by the gateway to provide a reduced set of capabilities for the two terminals. One such reduction would be to reduce the set offered by the gateway to a single capability of audio and single capability of video. A benefit provided by the selective restriction of the number of capabilities is that subsequent steps in the setup process may be performed more rapidly. As the media capabilities offered can be pared back to only those codecs supported in the gateway, the remainder of the negotiation can occur in a decoupled fashion at the faster rate supported by the protocol and the terminals.

In the embodiments illustrated in FIG. 3, the number of capabilities in the TCS transmitted from the gateway after receiving both the capabilities from both terminals are selectively restricted to just one audio capability and one video capability, as well as a single option for adaptation layer for each of the media types. Other embodiments selectively reduce the number of TCS capabilities to greater numbers of capabilities less than the total number of possible capabilities. As will be evident to one of skill in the art, the reduction in the number of capabilities and the requirements on the gateway are related, with fewer capabilities resulting in fewer transcoders being required. One of ordinary skill in the art would recognize many variations, modifications, and alternatives.

The TCS is reduced to provide a selected capability for the session. The session is established in a decoupled fashion, but the capabilities are selected to provide a compatible service. The gateway is capable of receiving and transmitting media in conformance with the selected capabilities.

If the gateway reduces the selection of capabilities so that only a single media mode is capable of eventuating from the negotiation, then a gateway may take advantage of being able to pre-allocate its resources at capability reception point.

The embodiment illustrated in FIG. 3 does not provide features to avoid media corruption as described in relation to FIG. 2. As a result, a media synchronization point is provided at the gateway, incurring a delay in the general case. The media synchronization point at the gateway uses a notification from a terminal that it is capable of receiving media before a gateway will signify that it is ready to also receive media by sending a message to the transmitting terminal that it is ready to receive. In this way, media freely flows from end to end, with a possible conversion/transcoding at the gateway, but without a concern of clipping the media being transmitted at the gateway. In the figure, this media synchronization point is shown in both directions. For the gateway to know that the H.324-like terminal is ready to decode the media transmitted, the OLC Ack (with an MTE Ack for the multiplexing of the media) is sent from H.324-like terminal to the gateway. The gateway can now safely indicate to the H.323 terminal that it is OK to transmit media, and it does this through its OLC Ack on the H.323 side. Media then is transmitted from the H.323 side and can be forwarded, possibly with transcoding or other processing, to the H.324 side. The reverse direction media synchronization for media transmitted from H.324 to H.323 is conducted in the same fashion with the two terminals' roles reversed.

According to an embodiment of the present invention, a method of establishing a reduced setup time session through a gateway is provided. The session is conducted between a first terminal operating under a first protocol and a second terminal operating under a second protocol. As an example, the first protocol and the second protocol may be a same protocol or a different protocol. Merely by way of example, the first protocol is an H.324-like protocol in one embodiment, such as H.324 or 3G-324M. The second protocol may be a SIP-like protocol, an RTSP-like protocol, an H.323-like protocol, or an HTTP-like protocol.

The method includes receiving a first capability message transmitted from the first terminal to the gateway and receiving a second capability message transmitted from the second terminal to the gateway. The first capability message may be a terminal capability set message and the second capability message may be a terminal capability set message. In an embodiment, the first capability message may be media, a fast connect message, or be contained in a call signaling message. Alternatively, the second capability message may be an SDP-like message or a DESCRIBE message depending on the application.

The method also includes processing the first capability message and the second capability message to form a third capability message associated with the first capability message and a fourth capability message associated with the second capability message.

The method further includes transmitting a third capability message from the gateway to the first terminal and transmitting a fourth capability message from the gateway to the second terminal. Embodiments of the present invention provide for paring back of capabilities. For example, the number of video capabilities in the third capability message may be less than the number of video capabilities in the first capability message, for example, a single video capability. Additionally, the number of audio capabilities in the third capability message may be less than the number of audio capabilities in the first capability message, for example, a single audio capability. Moreover, the number of multiplexer table entries in the third capability message may be less than the number of multiplexer table entries in the first capability message, for example a single multiplexer table entry. Additionally, the audio, video, or other capabilities in the fourth capability message may be pared back in a manner similar to that discussed above. One of ordinary skill in the art would recognize many variations, modifications, and alternatives.

Moreover, the method includes receiving a first request message transmitted from the second terminal to the gateway. The first request message is related to a process for opening a second media channel adapted to support a transmission of a second media stream from the second terminal to the gateway. The first request message may be associated with the second capability message and the fourth capability message. In an embodiment, the first request message is an open logical channel request.

The method also includes transmitting a second request message from the gateway to the first terminal. The second request message is related to a process for opening a first media channel adapted to support a transmission of a first media stream from the gateway to the first terminal. The second request message may be associated with the first capability message and the third capability message. In an embodiment, the second request message is at least one of a multiplexer table entry request or an open logical channel request.

Transmitting the second request message is performed independent of receiving the first request message. For example, the second request message may be transmitted from the gateway to the first terminal prior to receiving the first request message transmitted from the second terminal to the gateway. In an embodiment, transmitting the second request message from the gateway to the first terminal is performed independent of the first request message being transmitted from the second terminal to the gateway. In another embodiment, transmitting the second request message from the gateway to the first terminal is performed independent of the second terminal adopting a capability included in the fourth capability message.

Furthermore, the method includes receiving a first response message transmitted from the second terminal to the gateway. The first response message is related to the process for opening the second media channel. In an embodiment, the first response message is an open logical channel acknowledgement. The method also includes transmitting a second response message from the gateway to the first terminal. In an embodiment, the second response message is at least one of a multiplexer table entry acknowledgement or open logical channel acknowledgement. Transmitting the second response message is performed in response to receiving the first response message.

In another embodiment, the method further includes transmitting a first media stream between the first terminal and the gateway. The first media stream is associated with the first media channel and is transmitted between the gateway and the second terminal. Additionally, the method includes transmitting a second media stream between the second terminal and the gateway. The second media stream is associated with the second media channel and is transmitted between the gateway and the first terminal.

It should be appreciated that the specific steps illustrated in FIG. 3 provide a particular method of establishing a reduced setup time session through a gateway according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
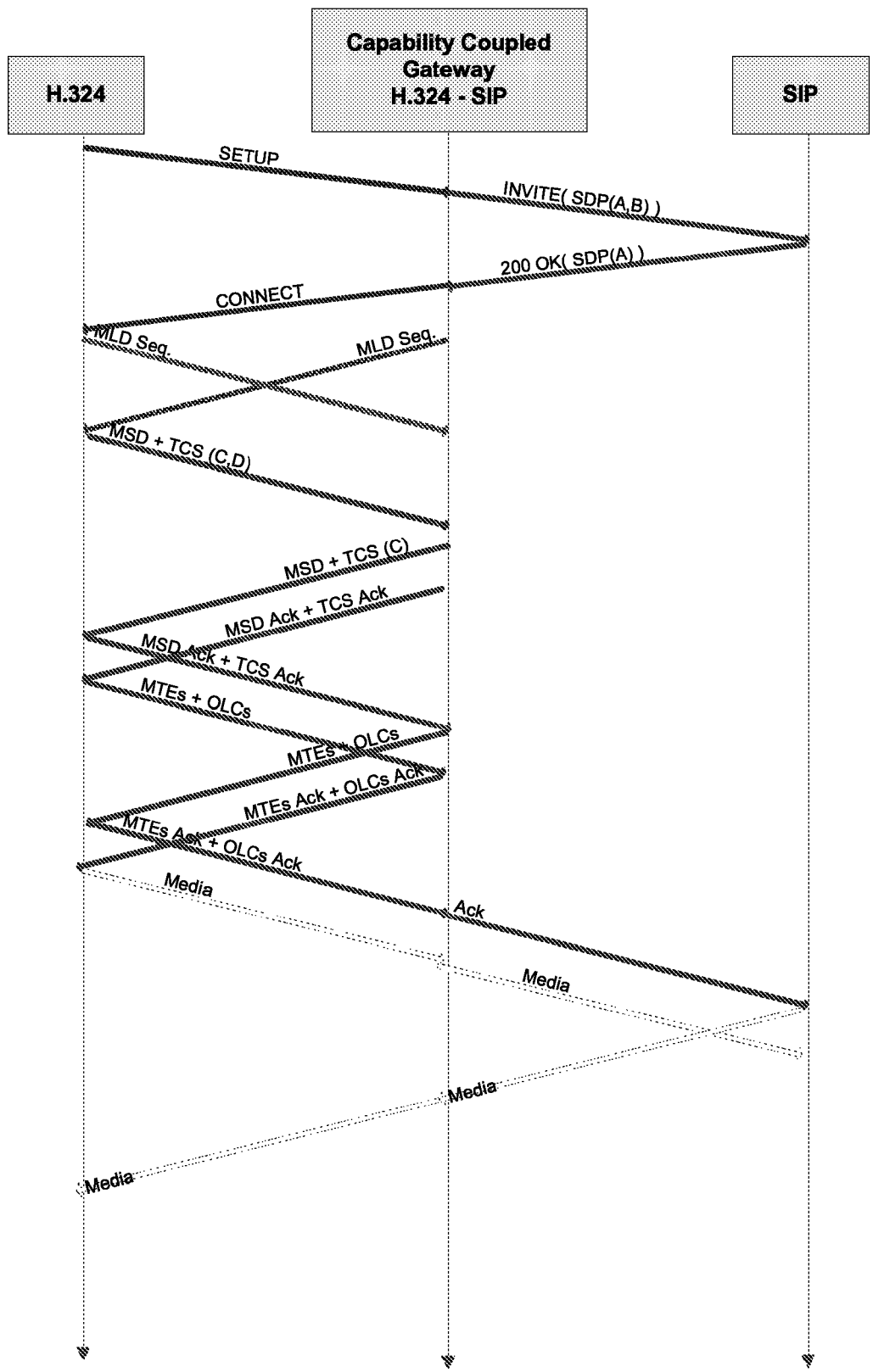
FIG. 4 is a simplified diagram illustrating a call setup procedure between an H.324-like device and a SIP-like device using a capability coupled gateway according to an embodiment of the present invention.

FIG. 4 is a simplified diagram illustrating a call setup procedure between an H.324-like device and a SIP-like device using a capability coupled gateway according to an embodiment of the present invention. Embodiments of the present invention provide the same two points in FIG. 4 as described in relation to FIG. 3, especially in relation to the H.324 side. Here, the terminal capabilities expressed to the H.324 side from the gateway, in the TCS(C) are coupled to the capability information and dependent on the capability information and gateway decisions related to the SIP terminal in its Session Description Protocol (SDP), or a variation of SDP (SDP-like) information in the SDP(A) message.

The media synchronization point for media transmitted to the H.324 side is shown where the gateway receives the OLC-Ack and propagates a SIP Ack from gateway to the SIP after the OLC Ack from the H.324-like terminal is received. At this point, you have the appropriate channels established for the media and the media can be passed through the gateway.

In FIG. 4, the SIP terminal has pared the SDP transmitted from the gateway initially in SDP(A,B) back as illustrated in 2000K(SDP(A)). The gateway initially transmitted an SDP message describing capabilities that it would be able to support for a session established between the two ends. This does not mean it would need to support the full mesh as would be required in the fully decoupled flow of FIG. 2, since, after the terminal has selected a mode on the SIP side, it uses this information to determine the capabilities to transmit to the H.324 side. It is also possible that the information received from the SIP side could allow the gateway to transmit its TCS to the H.324 side without receiving a TCS from the H.324 side. This may allow a slightly quicker overall session setup if possible. For example, if the SIP determination has ended in a mode that the gateway can transcode to towards the H.324 side. Or alternatively, if the SIP side selected a mandatory codec on the other side, then the paring back could be performed and the message transmitted without concern for the incoming capabilities.

Figure 5:
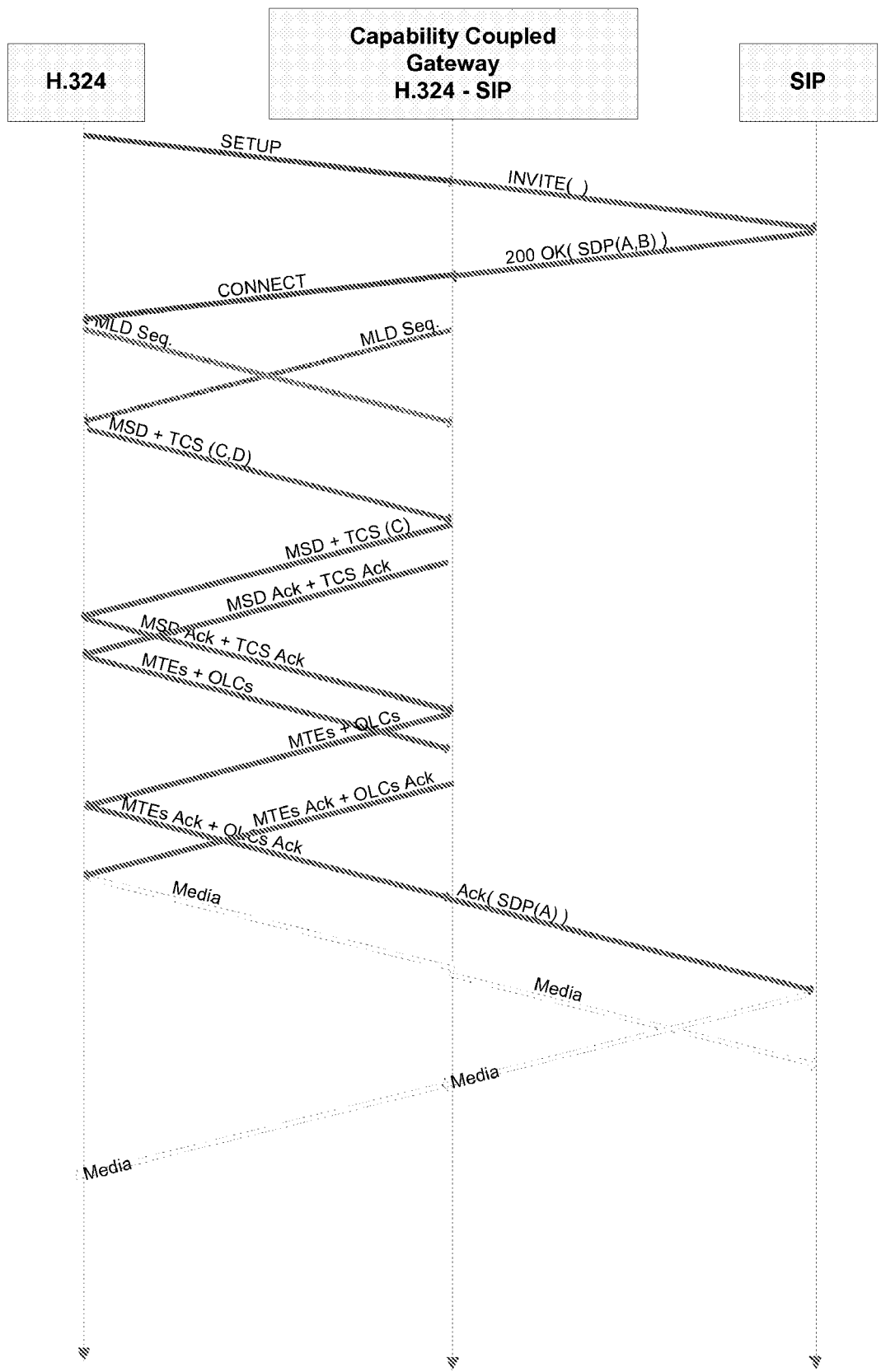
FIG. 5 is a simplified diagram illustrating an alternative call setup procedure between an H.324-like device and a SIP-like device using a capability coupled gateway according to an embodiment of the present invention.

FIG. 5 is a simplified diagram illustrating an alternative call setup procedure between an H.324-like device and a SIP-like device using a capability coupled gateway according to an embodiment of the present invention. This is similar to the flow shown in FIG. 4, but with a key difference on how the gateway transmits its capabilities. Here, if a terminal supports the reception of an empty invite (an invite without an SDP-like content), which most terminals do (many early terminals would not have accepted this empty invite and utilize the behavior associated with FIG. 4), the gateway holds back its capabilities, and instead requests that the SIP terminal describe its capabilities fully to the gateway before the gateway will answer with capabilities of its own. The media capabilities can then be synchronized as in FIG. 3 so that the TCS(C,D) from the H.324 side and the SDP(A,B) from the SIP side are both received before the gateway describes its capabilities out to the terminals in the TCS(C) to the H.324 side and the Ack(A) to the SIP side. The media gateway could again pare back the capabilities to just a single type and then pre-allocate some resources such as transcoders and allow the rest of the call setup to proceed in a decoupled fashion. The media synch point is the same in FIG. 5 as it was for FIG. 4.

In the situation in which a gateway receives an incoming INVITE with an SDP-like message from the SIP side, media negotiation would proceed via an SDP-like protocol in the same way as this flow. If an incoming empty INVITE was received at the gateway from the SIP-like side, then the flow would be similar again to that shown in FIG. 4.

Figure 6:
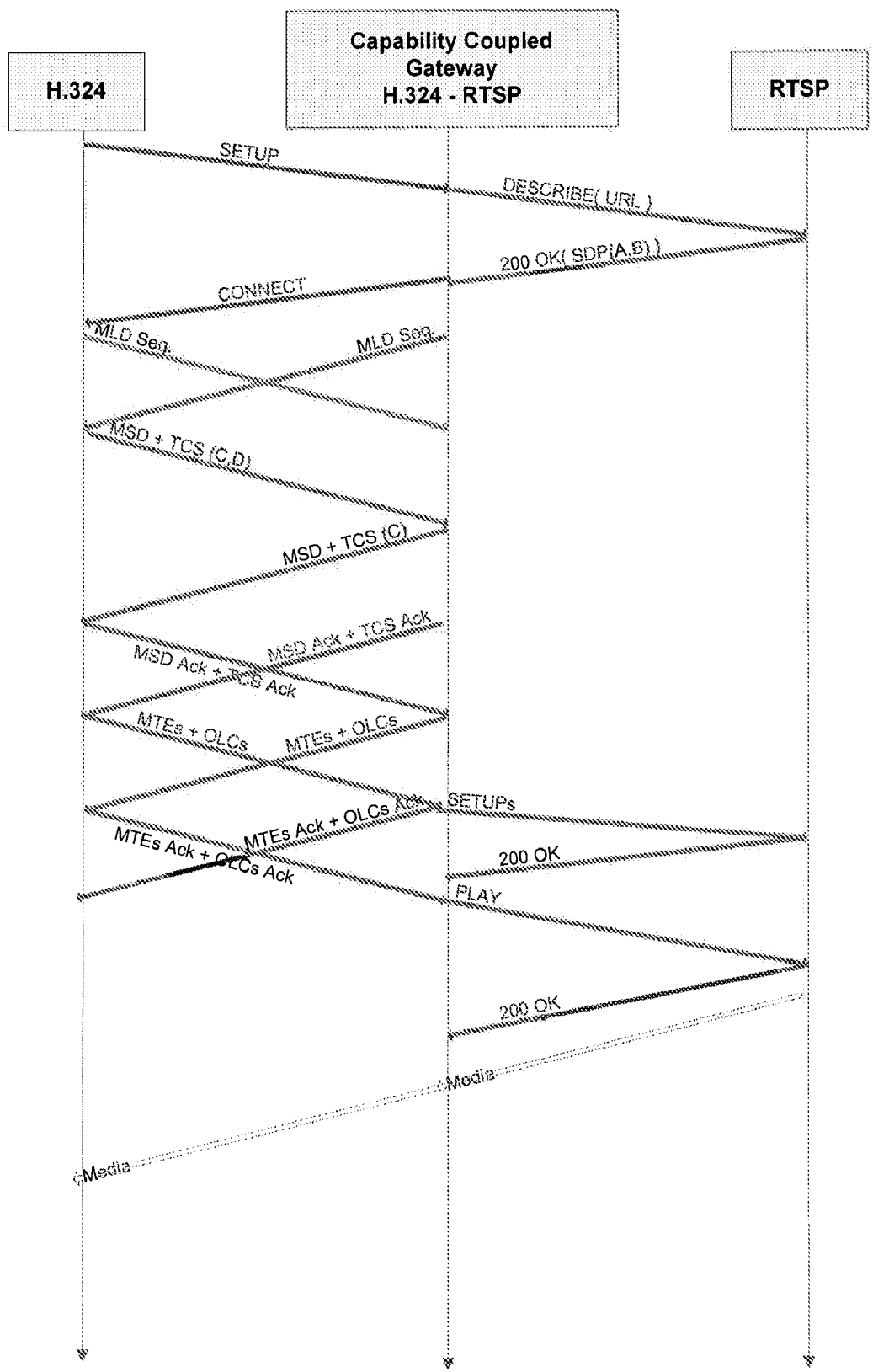
FIG. 6 is a simplified diagram illustrating a call setup procedure between an H.324-like device and an RTSP-like device using a capability coupled gateway according to an embodiment of the present invention.

FIG. 6 is a simplified diagram illustrating a call setup procedure between an H.324-like device and an RTSP-like device using a capability coupled gateway according to an embodiment of the present invention. The similarities between the SIP and RTSP protocol are evident in this figure as the synchronization for media capability and media synchronization are very similar. Capability knowledge at the gateway from the RTSP device is determined by an empty Ack equivalent, the DESCRIBE(URL), which will return the media description in the SDP(A,B). The H.324 side continues as described for FIG. 3. The media synchronization point is shown here by delaying the media transmission at the RTSP server, allowed by a PLAY request, until an OLC Ack is received at the gateway.

Referring to the left-sides of FIGS. 3, 5, and 6, a method of establishing a reduced setup time session between an H.324-like terminal and a gateway is provided according to embodiments of the present invention The session operates under a predetermined protocol. The method includes receiving a second capability message transmitted from a second terminal to the gateway and receiving a first capability message transmitted from the H.324-like terminal to the gateway. The method also includes processing the first capability message to form a third capability message associated with the first capability message. In an embodiment, the number of video capabilities in the second capability message is less than the number of video capabilities in the first capability message, for example, a single video capability. In another embodiment, the number of audio capabilities in the second capability message is less than the number of audio capabilities in the first capability message, for example, a single audio capability. In yet another embodiment, the number of multiplexer table entries in the second capability message is less than the number of multiplexer table entries in the first capability message, for example, a single multiplexer table entry.

The method further includes transmitting the third capability message from the gateway to the H.324-like terminal after receiving the first capability message transmitted from the H.324-like terminal and receiving the second capability message transmitted from the second terminal to the gateway. Additionally, the method includes transmitting a request message from the gateway to the H.324-like terminal. The request message is related to a process for opening a media channel between the gateway and the H.324-like terminal and is transmitted independent of the capability negotiation process between the gateway and the second terminal. For example, the request message may include at least one of a multiplexer table entry request or an open logical channel request.

Moreover, the method includes receiving a response message transmitted from the H.324-like terminal to the gateway. The response message is related to the process for opening the media channel and may include at least one of a multiplexer table entry acknowledgement or open logical channel acknowledgement. The method also includes receiving a media stream transmitted from the H.324-like terminal to the gateway using the media channel and transmitting the media stream from the gateway to the second terminal. In an embodiment, the H.324-like terminal is a 3G-324M handset and the second terminal is either an H.323-like, an RTSP-like, or a SIP-like terminal.

Although the previous examples have been provided in the context of an H.324-like or an H.323-like terminal, utilizing appropriate protocols, this is not required by the present invention. In alternative embodiments, other terminals, referred to as H.32X-like terminals are utilized. These H.32X-like terminals share common features, for example, the use of the H.245 control protocol. H.323-like and H.324-like terminals are discussed herein as examples, but embodiments of the present invention provide method of utilizing other H.32X-like terminals to reduce the setup times in sessions established through a gateway. One of ordinary skill in the art would recognize many variations, modifications, and alternatives.

Figure 7:
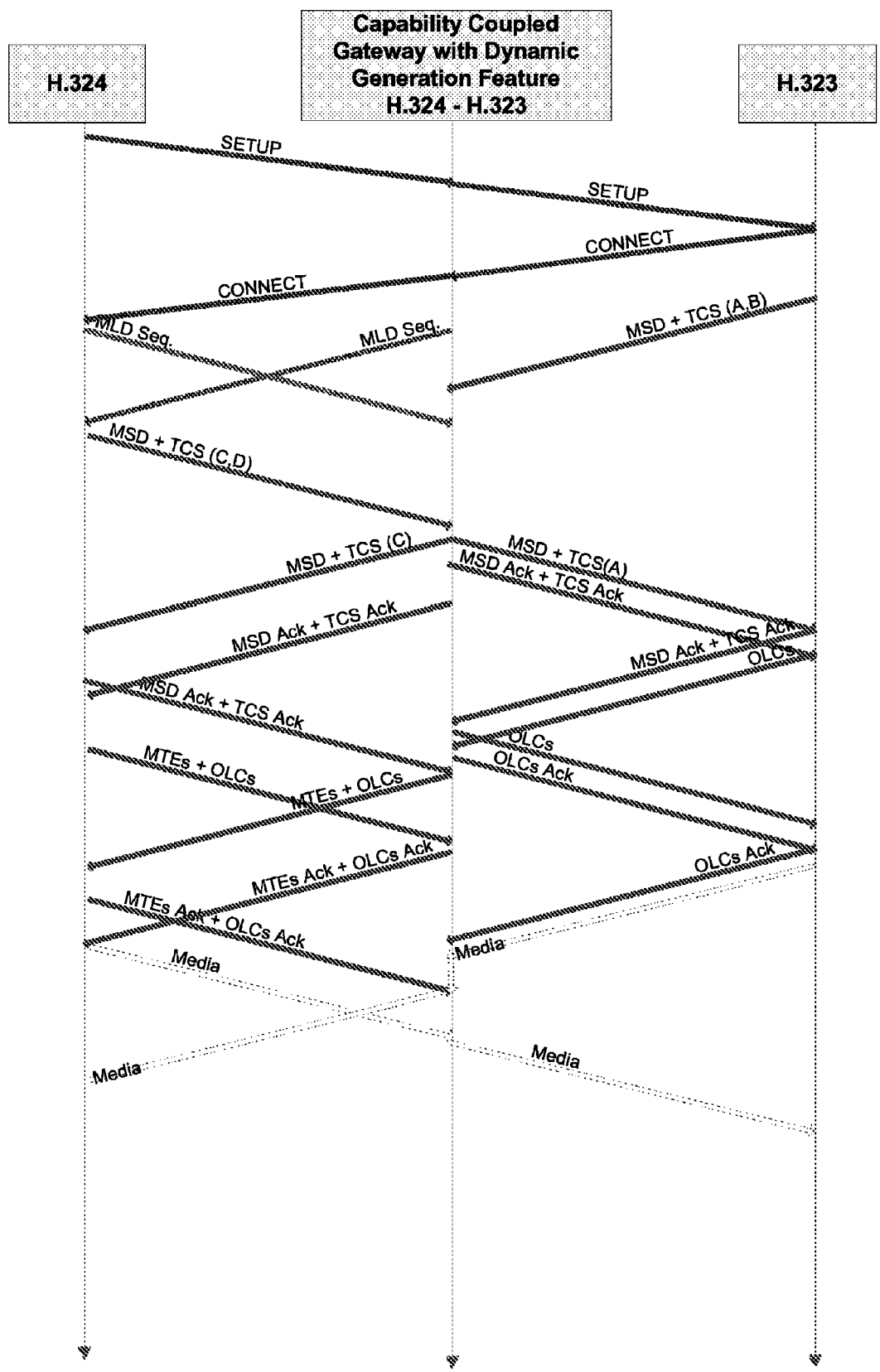
FIG. 7 is a simplified diagram illustrating a call setup procedure between an H.324-like device and an H.323-like device using a capability coupled gateway with a dynamic generation feature according to an embodiment of the present invention.

FIG. 7 is a simplified diagram illustrating a call setup procedure between an H.324-like device and an H.323-like device using a capability coupled gateway with a dynamic generation feature according to an embodiment of the present invention. As discussed in relation to FIG. 3, the capabilities from the H.324-like terminal and the H.323 terminal are used to determine the media capabilities that will be expressed by the gateway. TCS(C,D) and TCS(A,B) are both received before TCS(C) and TCS(A) are transmitted. However, the flow shown in FIG. 7 does not require a media synchronizations point, since the gateway contains the local generation of media decoder refresh points feature that was described with reference to FIG. 2. This allows the only coupling point between the two sides to be the capability exchange and then allows the rest of the negotiation to continue at maximum speed with no delay caused by necessities at the gateway. The session establishment time for media to be displayed is significantly better than the time shown where two coupling points were used, as can be seen by comparing FIG. 7 to FIG. 3. The media local content feature may not necessarily be employed always as the other side may indicate it is ready before the media arrives, but the ability to not impact the media with clipping and corruption allows the session establishment to progress more quickly.

The media recovery options involving waiting for a feature are also applicable to FIG. 7, but the session setup will be quickest if the local content generation feature is employed.

According to an embodiment of the present invention, a method of establishing a reduced setup time session through a gateway is provided. The session is conducted between a first terminal operating under a first protocol and a second terminal operating under a second protocol. The method includes receiving a first capability message transmitted from the first terminal to the gateway and receiving a second capability message transmitted from the second terminal to the gateway.

The method also includes processing the first capability message and the second capability message to form a third capability message and processing the first capability message and the second capability message to form a fourth capability message.

The method further includes transmitting the third capability message from the gateway to the first terminal and transmitting the fourth capability message from the gateway to the second terminal.

Moreover, the method includes receiving a first request message transmitted from the second terminal to the gateway. The first request message is related to a process for opening a second media channel adapted to support a transmission of a second media stream from the second terminal to the gateway. The method also includes transmitting a second request message from the gateway to the first terminal. The second request message is related to a process for opening a first media channel adapted to support a transmission of a first media stream from the gateway to the first terminal. Transmitting the second request message is performed independent of receiving the first request message.

Furthermore, the method includes receiving a first response message transmitted from the second terminal to the gateway. The first response message is related to the process for opening the second media channel. The method also includes transmitting a second response message from the gateway to the first terminal. Transmitting the second response message is performed independent of receiving the first response message.

In an alternative embodiment, the method further includes performing at least one of a buffering process to buffer the second media or a decoding process to decode the second media, receiving a third response message transmitted from the first terminal to the gateway, and thereafter, transmitting the second media stream from the gateway to the first terminal. As an example, the second media stream may include an intra-code frame.

Utilizing embodiments of the present invention, the second media stream includes a decoder refresh point, for example, an intra-coded frame. In some embodiments, the second request message is transmitted from the gateway to the first terminal prior to receiving the first request message transmitted from the second terminal to the gateway.

The various messages and processes performed in FIG. 7 may be or be performed, in some embodiments, in a manner similar to that described with respect to FIG. 3. For example, the first request message may include an open logical channel request and the first response message may include an open logical channel acknowledgement. The third response message may include an OLC Ack. In a particular embodiment, the first capability message is a terminal capability set message and the second capability message is a terminal capability set message. Additionally, the second capability message may be an SDP-like message or a DESCRIBE message. The third capability message may be a terminal capability set message. Moreover, the first capability message is media, a fast connect message, or contained in a call signaling message in various embodiments.

The first protocol and the second protocol may be the same protocol or different protocols. Such protocols include an H.324-like protocol (e.g., H.324 or 3G-324M), an H.323-like protocol, a SIP-like protocol, an RTSP-like protocol, or an HTTP-like protocol. In some embodiments, capabilities are pared back so that the number of video capabilities in the third capability message is less than the number of video capabilities in the first capability message, for example, a single video capability. The number of audio capabilities in the third capability message may be less than the number of audio capabilities in the first capability message, for example, a single audio capability. Additionally, the number of multiplexer table entries in the third capability message may be less than the number of multiplexer table entries in the first capability message, for example, a single multiplexer table entry. Moreover, the number of video capabilities in the third capability message may be one, the number of audio capabilities in the third capability message may be one, the number of video capabilities in the fourth capability message may be one and the number of audio capabilities in the fourth capability message may be one.

It should be appreciated that the specific steps illustrated in FIG. 7 provide a particular method of establishing a reduced setup time session through a gateway according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Referring to the left side of FIG. 7, a method of establishing a reduced setup time session between an H.324-like terminal and a gateway is provided by an alternative embodiment of the present invention. The session operates under a predetermined protocol. The method includes receiving a first capability message transmitted from the H.324-like terminal to the gateway and receiving a second capability message transmitted from a second terminal to the gateway.

The method also includes processing the first capability message and the second capability message to form a third capability message and transmitting the third capability message from the gateway to the H.324-like terminal. The method further includes transmitting the third capability message from the gateway to the H.324-like terminal and transmitting a first enablement message from the gateway to the second terminal. The first enablement message is related to media transmission enablement for a first media stream from the second terminal to the gateway and the first enablement message is transmitted prior to receiving a second enablement message from the first terminal at the gateway. The second enablement message is related to media transmission enablement for a second media stream from the gateway to the first device.

The method also includes receiving a first media stream at the gateway, processing the first media stream at the gateway to provide a processed media stream, and transmitting the processed media stream as the second media stream from the gateway. In a particular embodiment, the first media stream is received prior to receiving the second enablement message. As an example, processing the media stream may include identifying a temporal feature in the media stream (e.g., an intra-coded frame) that enables a decoder to establish a decoder refresh point. Processing may also include generating an intra-coded frame at the gateway, for example, by converting an inter-coded frame into an intra-coded frame.

In another embodiment, processing the media steam further includes generating a VideoFastUpdate-like message and transmitting the VideoFastUpdate-like message from the gateway to the second terminal. In yet another embodiment, processing the media stream includes generating an intra-coded frame by converting an inter-coded frame into an intra-coded frame.

It should be appreciated that the specific steps illustrated in FIG. 7 provide a particular method of establishing a reduced setup time session between an H.324-like terminal and a gateway according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
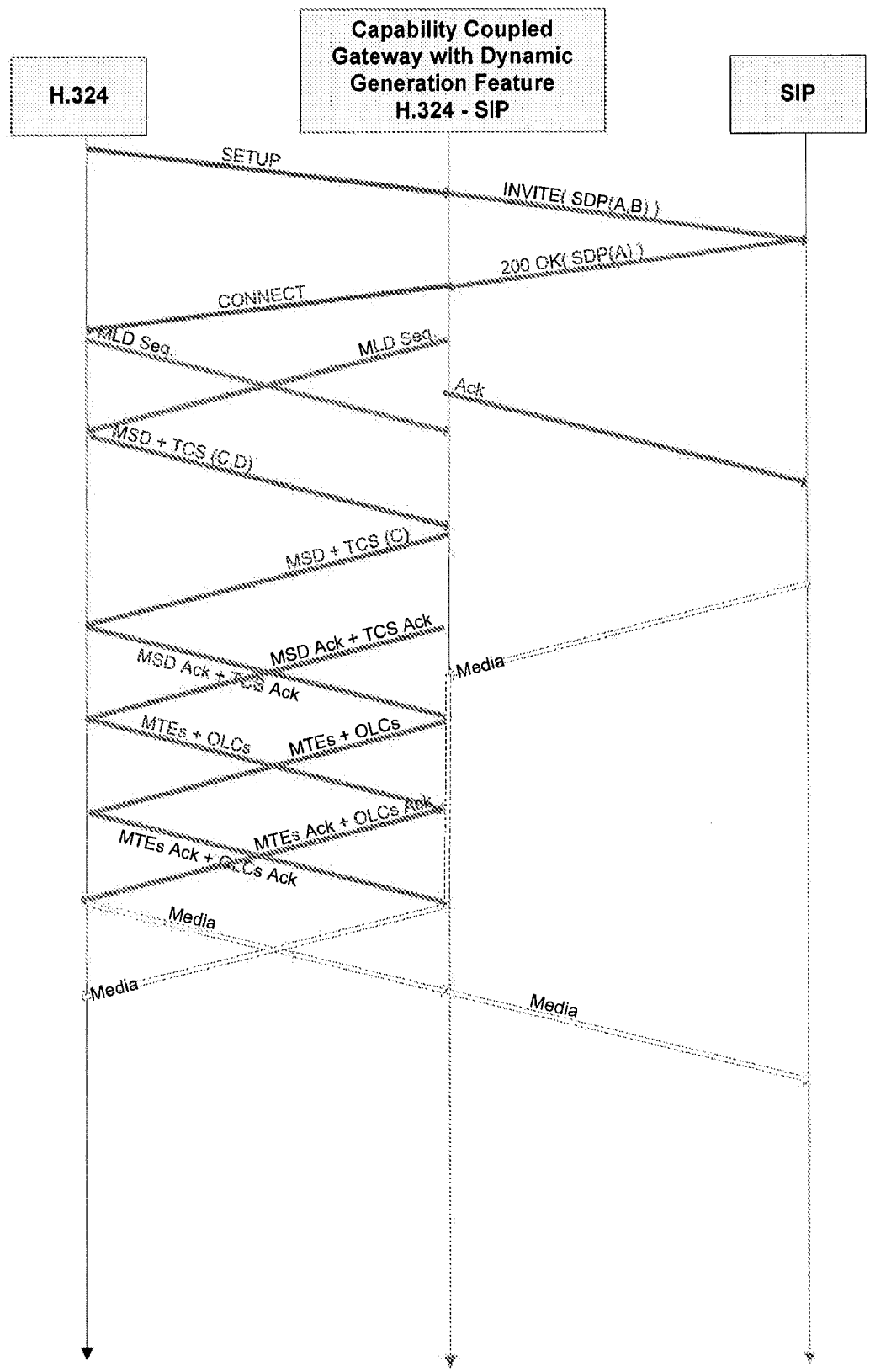
FIG. 8 is a simplified diagram illustrating a call setup procedure between an H.324-like device and an SIP-like device using a capability coupled gateway with a dynamic generation feature according to an embodiment of the present invention.

FIG. 8 is a simplified diagram illustrating a call setup procedure between an H.324-like device and an SIP-like device using a capability coupled gateway with a dynamic generation feature according to an embodiment of the present invention. The session setup proceeds with capability negotiation as discussed in relation to FIG. 4, then the addition of the media recovery feature (likely the dynamic generation feature for intra coded frames) at the gateway as described in relation to FIG. 7 allows for the removal of the media synchronization point(s) and a faster session setup with media recovery if any media arrival timing mismatches do occur. Again the decrease in setup time from FIG. 8 to FIG. 4 is evident.

Figure 20:
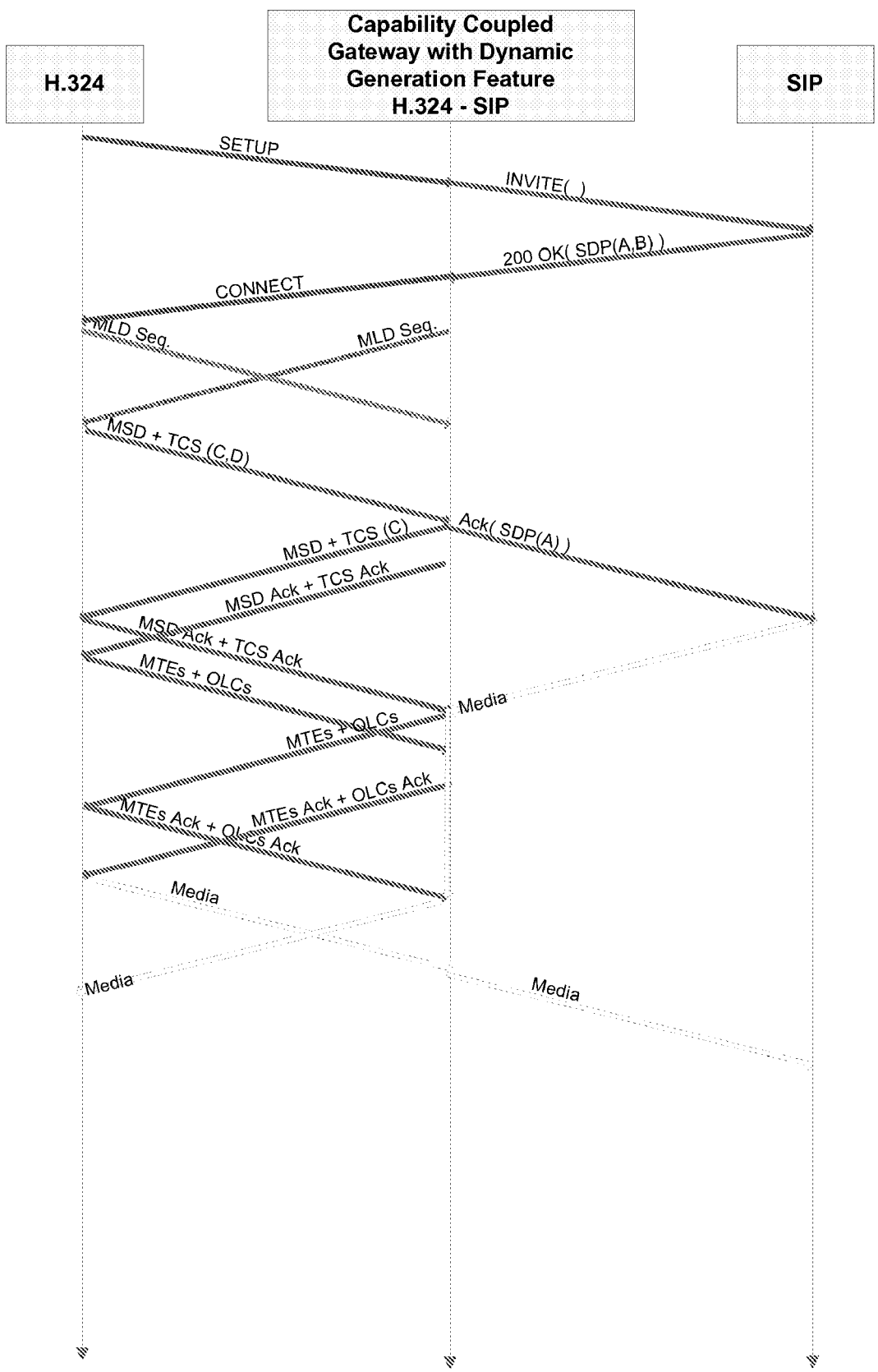
FIG. 20 is a simplified diagram illustrating a call setup procedure between an H.324-like device and a SIP-like device using a capability coupled gateway with a dynamic generation feature according to an embodiment of the present invention.

FIG. 20 is a simplified diagram illustrating a call setup procedure between an H.324-like device and a SIP-like device using a capability coupled gateway with a dynamic generation feature according to an embodiment of the present invention. The session setup proceeds with capability negotiation as discussed in relation to FIG. 5, then the addition of the media recovery feature (likely the dynamic generation feature for intra coded frames) at the gateway as described in relation to FIG. 7 allows for the removal of the media synchronization point(s) and a faster session setup with media recovery if any media arrival timing mismatches do occur. Again the decrease in setup time from FIG. 20 to FIG. 5 is evident.

Figure 9:
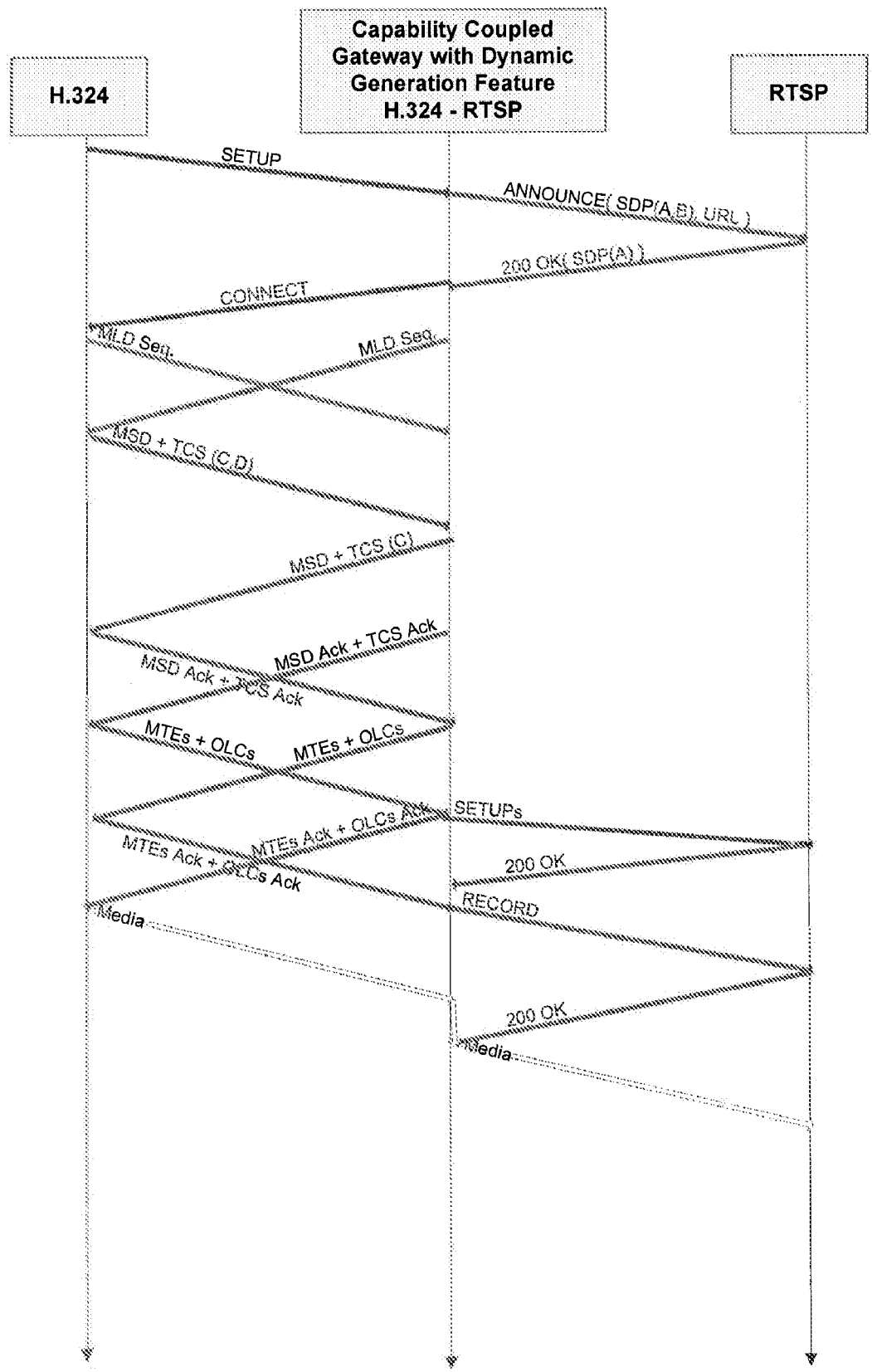
FIG. 9 is a simplified diagram illustrating a call setup procedure between an H.324-like device and an RTSP-like device using a capability coupled gateway with a dynamic generation feature according to an embodiment of the present invention.

FIG. 9 is a simplified diagram illustrating a call setup procedure between an H.324-like device and an RTSP-like device using a capability coupled gateway with a dynamic generation feature according to an embodiment of the present invention. Here, the RTSP device is acting as a media sink and is recording media from the H.324-like device. This may be the case for a video weblog, or "blog," or other upload service. The session setup is similar to that shown in relation to FIG. 6, but there is also the addition of a local generation feature for media decoder refresh points. Here, the session is established as quickly as possible after capabilities are coupled and decided at the gateway. Then, if the H.324-like device starts transmitting media before the RTSP device is ready to record, a feature will be generated immediately upon session being ready to receive the media. This is particularly important feature for the recording of video from a device as the intra coded frame needs to be present at the start of recorded media session for decent quality in all the future playbacks.

This feature of local refresh point generation at the gateway can actually be employed at any time during a session when a recording is being made and this guarantees quality of the recorded media. It allows for better synchronization between the recorder and the terminal as the gateway has instantaneous response to the indication that an I-frame should be sent based on service logic, and does not require a VFU to arrive at the handset. This should avoid clipping from the start of the media due to delays.

Figure 21:
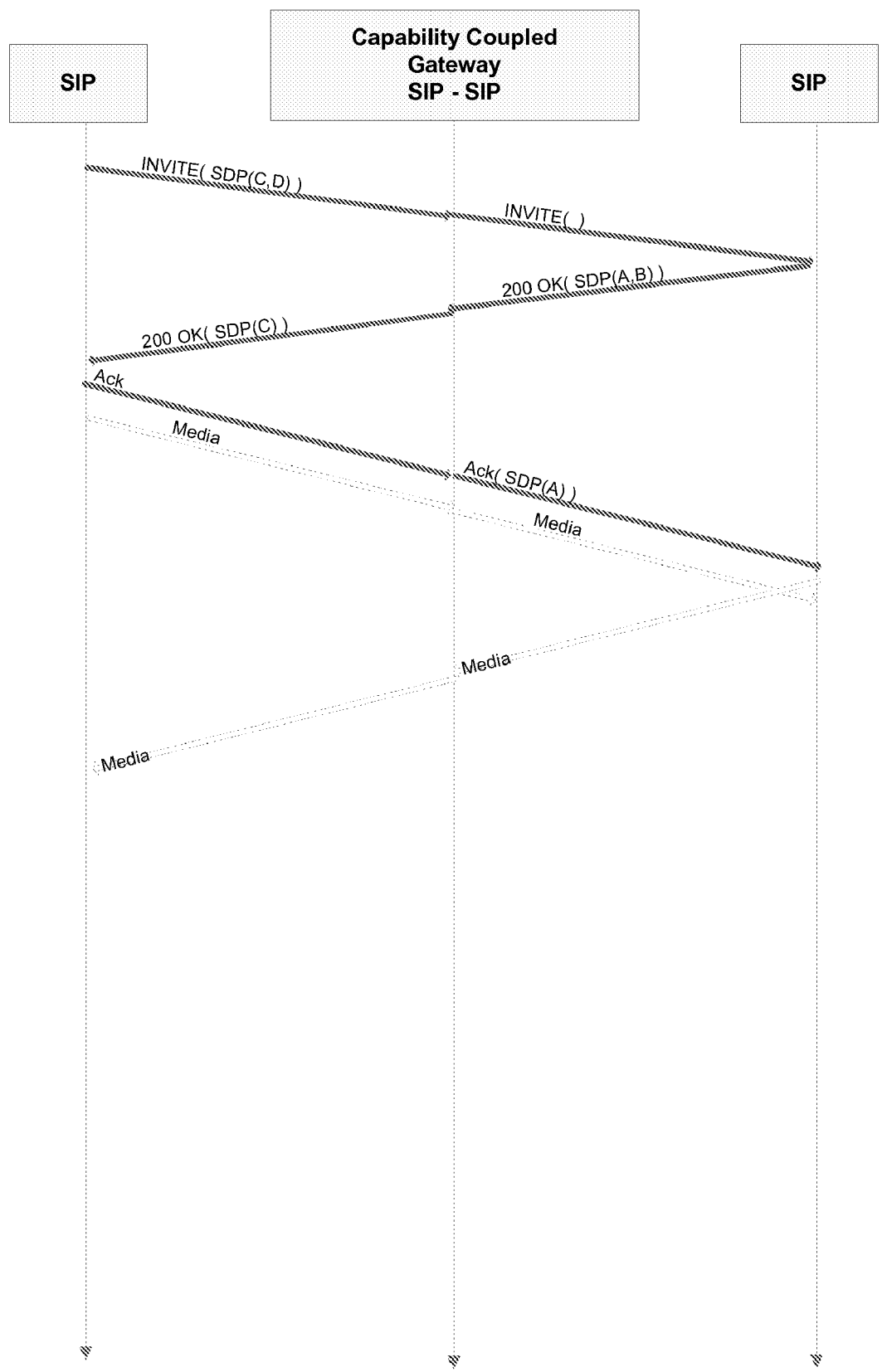
FIG. 21 is a simplified diagram illustrating a call setup procedure between a first SIP-like device and a second SIP-like device using a capability coupled gateway according to an embodiment of the present invention.

FIG. 21 is a simplified diagram illustrating a call setup procedure between a first SIP-like device and a second SIP-like device using a capability coupled gateway according to an embodiment of the present invention. As discussed in relation to FIG. 5, the capabilities of both SIP terminals are received at the gateway, in the form of an SDP(C,D) and SDP(A,B) before the gateway expresses its preferences via SDP(C) and Ack(A). The gateway receives a full capability set from the terminal on the right hand side due to its use of an empty INVITE. A media synchronization point exists and is dependent on the Ack from the left hand side indicating that it is now capable of receiving media. This is then propagated in the form of the Ack(A) to the right hand side, which sends media, and the system operates without a concern of the media being clipped.

Figure 22:
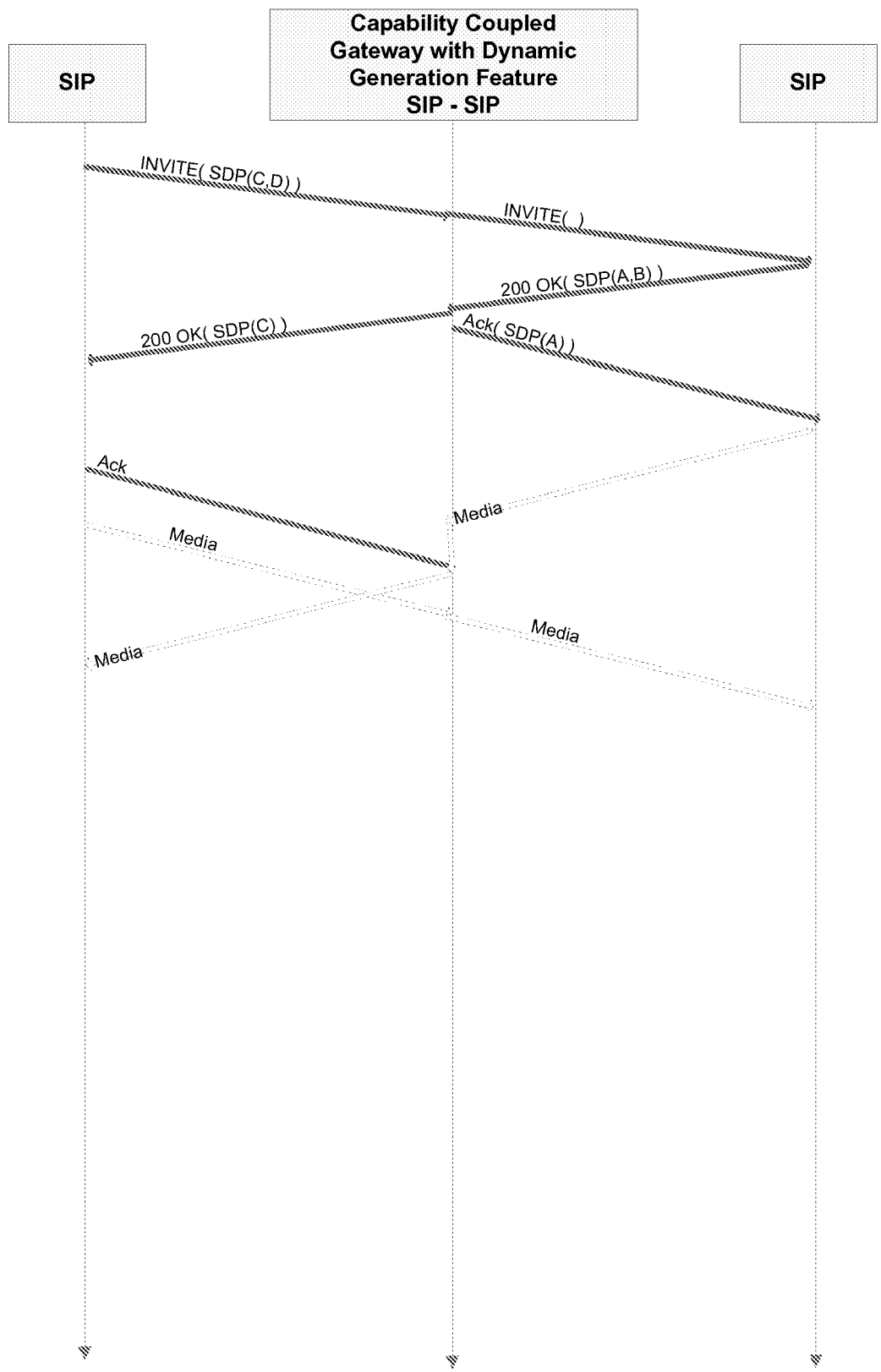
FIG. 22 is a simplified diagram illustrating a call setup procedure between a first SIP-like device and a second SIP-like device using a capability coupled gateway with a dynamic generation feature according to an embodiment of the present invention.

FIG. 22 is a simplified diagram illustrating a call setup procedure between a first SIP-like device and a second SIP-like device using a capability coupled gateway with a dynamic generation feature according to an embodiment of the present invention. The flow is the same as with FIG. 21 initially but the media synchronization point is removed due to the presence of the local feature generation ability. This media relaxation allows for a much earlier transmission of the Ack (A). As can be seen in comparison to FIG. 21, the removal of the media synchronization point allows for a fast session setup time end to end.

In an embodiment of the present invention, a method of establishing a reduced setup time session between a first SIP-like terminal and a second SIP-like terminal is provided. The session is conducted between the first SIP-like terminal and the second SIP-like terminal through a gateway. The method includes receiving a first call setup message transmitted from the first SIP-like terminal to the gateway. The first call setup message includes a first capability message. As an example, the first capability message may be an SDP-like message. The method also includes transmitting a second call setup message from the gateway to the second SIP-like terminal. For example, the second call setup message may include a second capability message, such as an empty INVITE.

The method further includes receiving a second capability message transmitted from the second SIP-like terminal to the gateway, transmitting a first capability response message from the gateway to the first SIP-like terminal, transmitting a second capability response message from the gateway to the second SIP-like terminal, and receiving a media stream transmitted from the second SIP-like terminal to the gateway. As an example, transmitting the first capability response message to the first SIP-like terminal may be performed after receiving the second capability message transmitted from the second SIP-like terminal to the gateway.

According to some embodiments, the capabilities are pared down in the response message. Thus, the number of video capabilities in the first capability response message may be less than a number of video capabilities in the first capability message, for example, a single video capability. Additionally, the number of audio capabilities in the first capability response message may be less than the number of audio capabilities in the first capability message, for example a single audio capability. Moreover, the number of multiplexer table entries in the first capability response message may be less than the number of multiplexer table entries in the first capability message, for example, a single multiplexer table entry.

Moreover, the method includes processing the media stream, receiving an acknowledgment message transmitted from the first SIP-like terminal to the gateway, and thereafter, transmitting the processed media stream from the gateway to the first SIP-like terminal. The acknowledgement message is received at the gateway after transmitting the second capability response message. By way of example, receiving the acknowledgment message transmitted from the first SIP-like terminal to the gateway may be performed independent of receiving the media stream transmitted from the second SIP-like terminal to the gateway.

According to an embodiment, processing the media stream includes identifying a temporal feature in the media stream that enables a decoder to establish a decoder refresh point. The feature may be an intra-coded frame. In another embodiment, processing the media steam further includes generating a VideoFastUpdate-like message and transmitting the VideoFastUpdate-like message from the gateway to the second terminal. In yet another embodiment, processing the media stream includes generating an intra-coded frame, for example, by converting an inter-coded frame into an intra-coded frame.

In an alternative embodiment, the method includes receiving a second media stream transmitted from the first SIP-like terminal to the gateway and transmitting the second media stream from the gateway to the second SIP-like terminal.

It should be appreciated that the specific steps illustrated in FIG. 22 provide a particular method of establishing a reduced setup time session between a first SIP-like terminal and a second SIP-like terminal according to an embodiment of the present invention. Other sequences of steps may also be performed according to alternative embodiments. For example, alternative embodiments of the present invention may perform the steps outlined above in a different order. Moreover, the individual steps illustrated in FIG. 22 may include multiple sub-steps that may be performed in various sequences as appropriate to the individual step. Furthermore, additional steps may be added or removed depending on the particular applications. One of ordinary skill in the art would recognize many variations, modifications, and alternatives.

In an alternative embodiment, a method of establishing a reduced setup time session between a first SIP-like terminal and a second SIP-like terminal is provided. The session is conducted through a gateway. The method includes performing a first session setup process between the first terminal and the gateway and performing a second session setup process between the second terminal and the gateway. The second session setup process is performed independent of the first session setup process.

Performing the first session setup process may include receiving a first INVITE message, which includes a first capabilities message, transmitted from the first SIP-like terminal to the gateway, processing the first capabilities message, transmitting a first capabilities response message from the gateway to the first SIP-like terminal, and receiving an acknowledgment message transmitted from the first SIP-like terminal to the gateway. Performing the second session setup process may include transmitting a second INVITE message, which may be an empty INVITE message, from the gateway to the second SIP-like terminal, receiving a second capabilities response message transmitted from the second SIP-like terminal to the gateway, processing the second capabilities response message, and transmitting an acknowledgement message (e.g., an SDP-like message) from the gateway to the second SIP-like terminal.

The method also includes receiving a media stream transmitted from the second SIP-like terminal to the gateway, processing the first media stream, providing an intra-coded frame, and thereafter, transmitting the intra-coded frame and the processed media stream from the gateway to the first SIP-like terminal. Processing the media stream may include identifying a temporal feature in the media stream that enables a decoder to establish a decoder refresh point. The temporal feature may be an intra-coded frame, which may be generated by converting an inter-coded frame into an intra-coded frame. Additionally, the method may include generating a VideoFastUpdate or a VideoFastUpdate-like message and transmitting the VideoFastUpdate or VideoFastUpdate-like message from the gateway to the second terminal.

In a specific embodiment, the method additionally includes receiving a second media stream transmitted from the first SIP-like terminal to the gateway and transmitting the second media stream from the gateway to the second SIP-like terminal. As discussed above, the number of video capabilities, audio capabilities, and multiplexer table entries may be pared down by the gateway. In some embodiments, the number is pared down to a single capability or multiplexer table entry.

Figure 10:
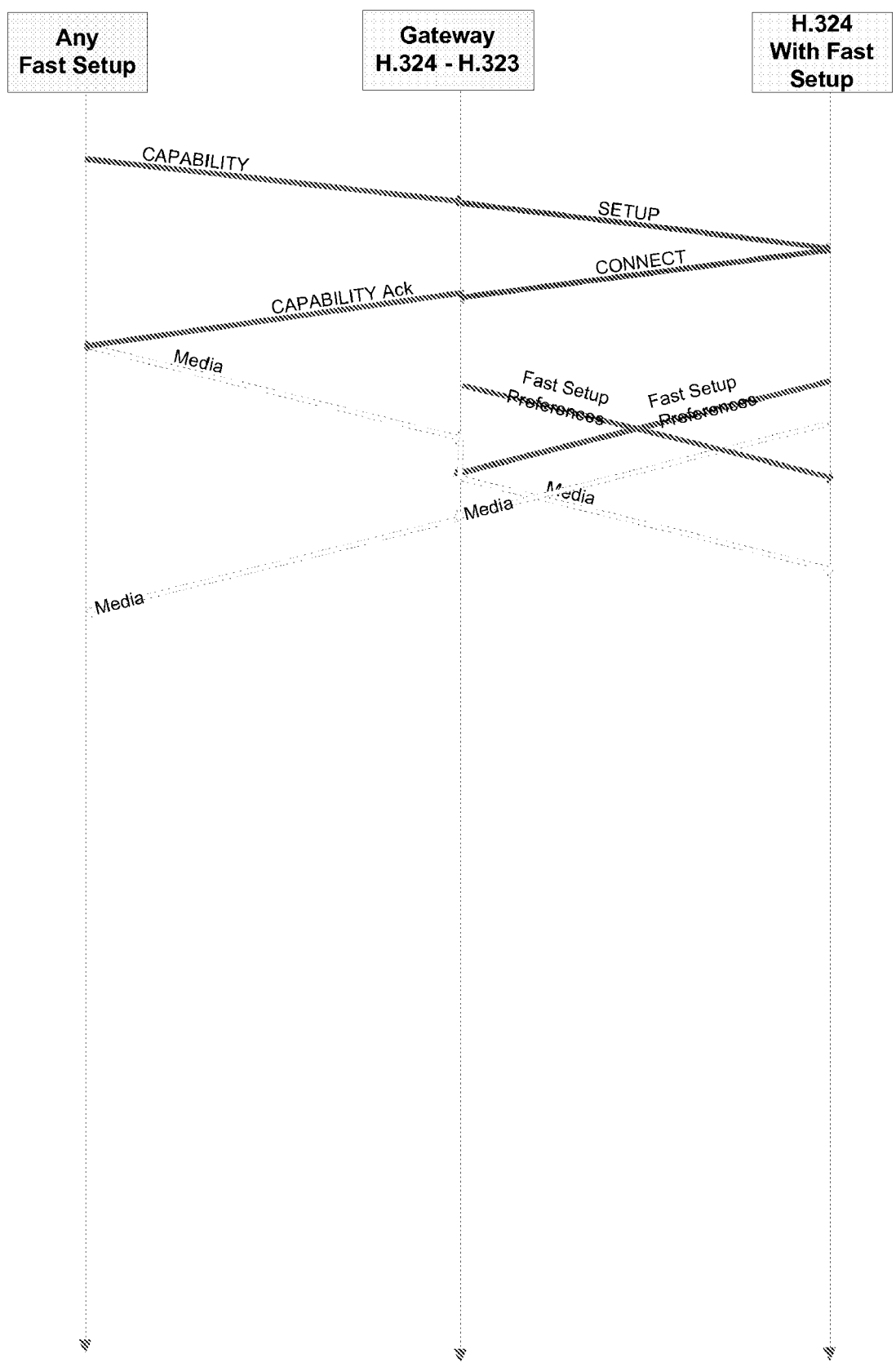
FIG. 10 is a simplified diagram illustrating a call setup procedure between a first device implementing an accelerated procedure and an H.324-like device implementing an accelerated procedure using a gateway according to an embodiment of the present invention.

FIG. 10 is a simplified diagram illustrating a call setup procedure between a first device implementing an accelerated procedure and an H.324-like device implementing an accelerated procedure using a gateway according to an embodiment of the present invention. After the gateway receives a fast setup capability from the first device, using any number of session setup acceleration techniques, it begins to transmit its H.324 related capabilities, based in part, upon the capabilities received from the left hand side. The most likely capabilities processing would be a reduction of known capabilities to produce a known session type in a similar way to shown in FIG. 4, where some capabilities are likely needed to be expressed earlier than would be desired for optimal capability negotiation. The behavior here could also proceed in a fully decoupled fashion as described in association with FIG. 2, taking advantage of the speed gain in the decoupled capabilities, the removal of the need for a media synchronization point, and the speed associated with the pair of respective session setup techniques.

Figure 11:
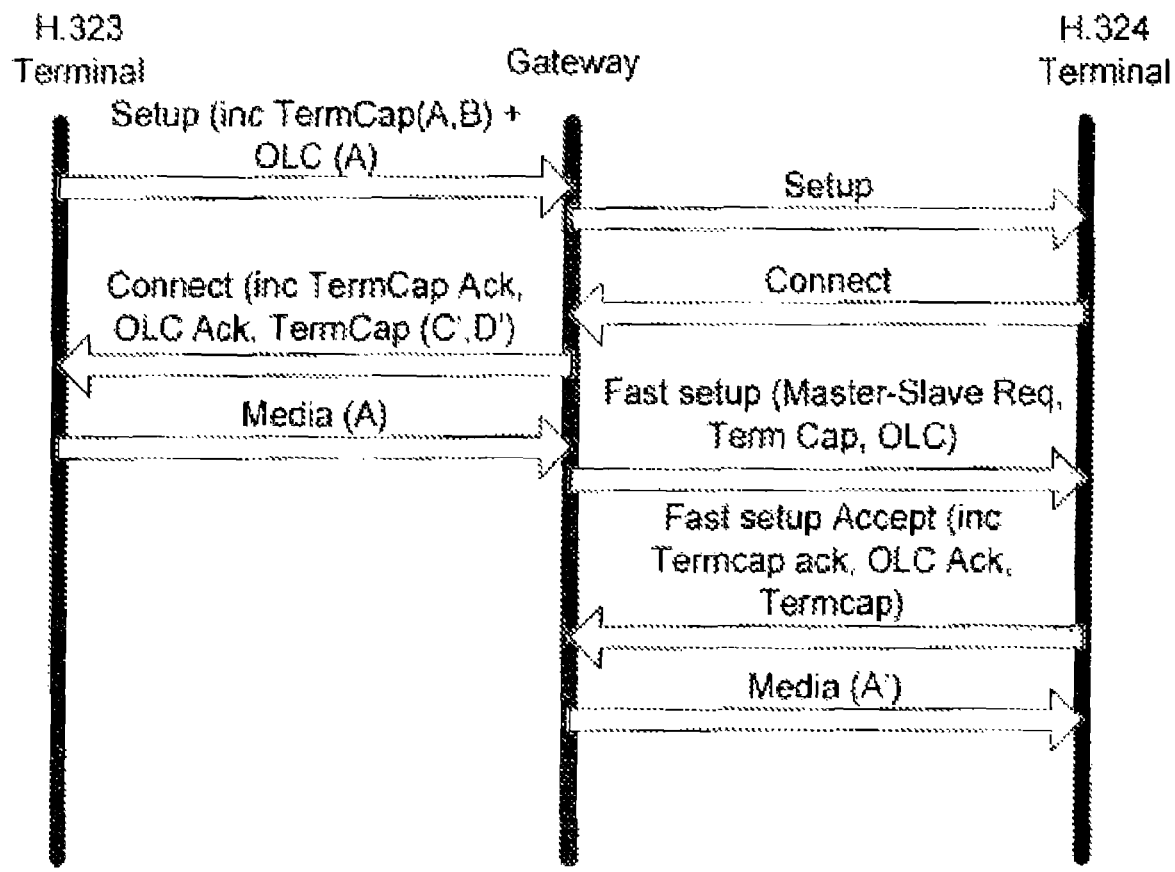
FIG. 11 is a simplified call flow illustrating call establishment from an H.323 device implementing an accelerated procedure through a gateway to an H.324 device implementing an accelerated procedure according to an embodiment of the present invention.

FIG. 11 is a simplified call flow illustrating call establishment from an H.323 device implementing an accelerated procedure through a gateway to an H.324-like device implementing an accelerated "fast setup" procedure according to an embodiment of the present invention. Embodiments of the present invention provide for decoupled operation in the context of an H.323 fast connect+H.324 fast setup implementation. As illustrated in FIG. 11, both the H.323 terminal and H.324-like terminal support "fast connect" and "fast setup" procedures, so the session may be established in a smaller number of steps than conventional methods since several procedures are aggregated into single messages on both sides of the gateway. This is the method described in relation to FIG. 10, but applied to the H.324 fast setup procedures described in U.S. Provisional Patent Application No. 60/433, 252, filed on Dec. 12, 2002.

Figure 12:
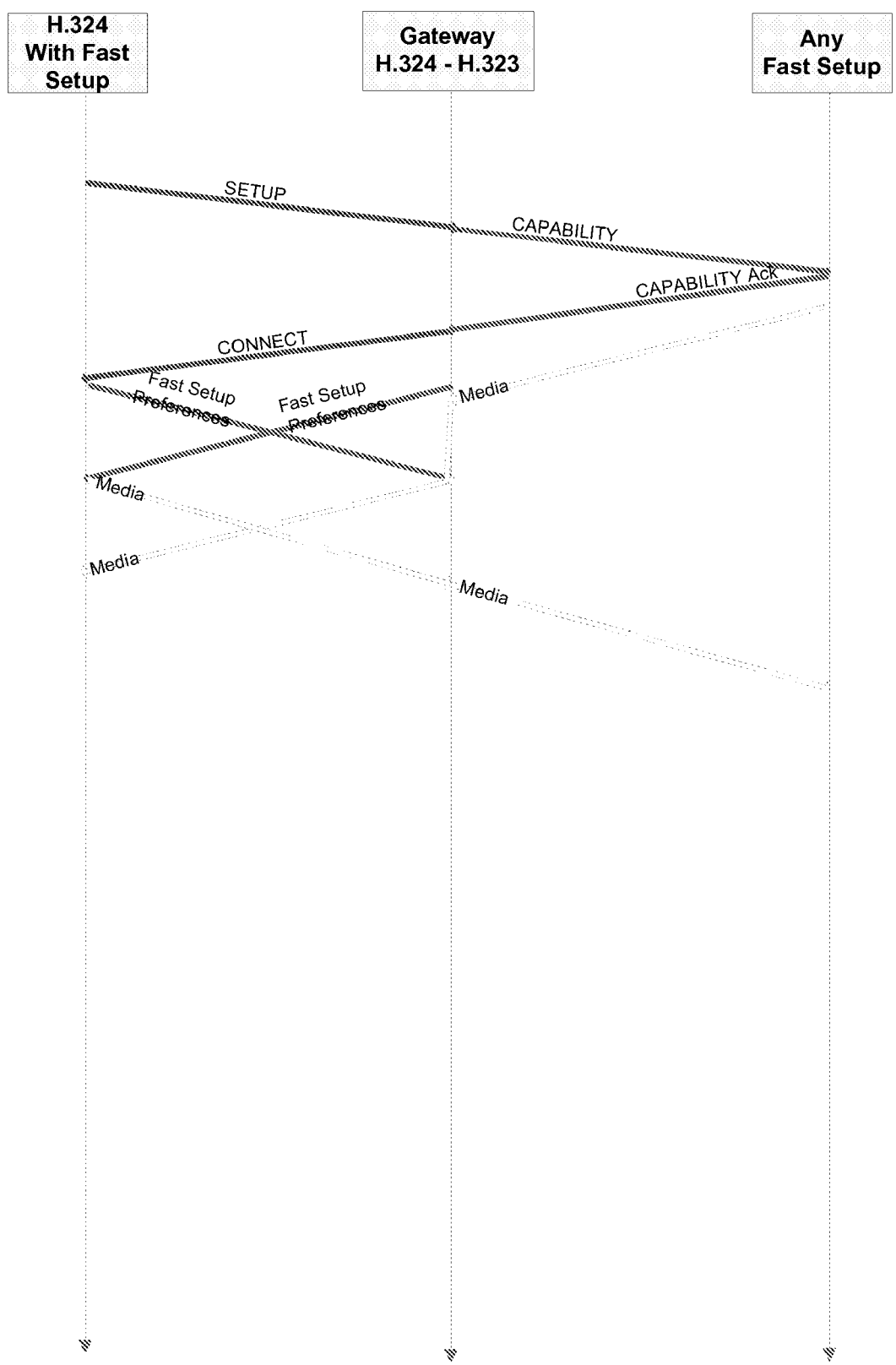
FIG. 12 is a simplified diagram illustrating a call setup procedure between an H.324-like device implementing an accelerated procedure and a device implementing an accelerated procedure using a gateway according to an embodiment of the present invention.

FIG. 12 is a simplified diagram illustrating a call setup procedure between an H.324-like device implementing an accelerated procedure and a device implementing an accelerated procedure using a gateway according to an embodiment of the present invention. FIG. 12 is similar to FIG. 10, but shows the session setup proceeding from a call originated from the H.324 side.

Figure 13:
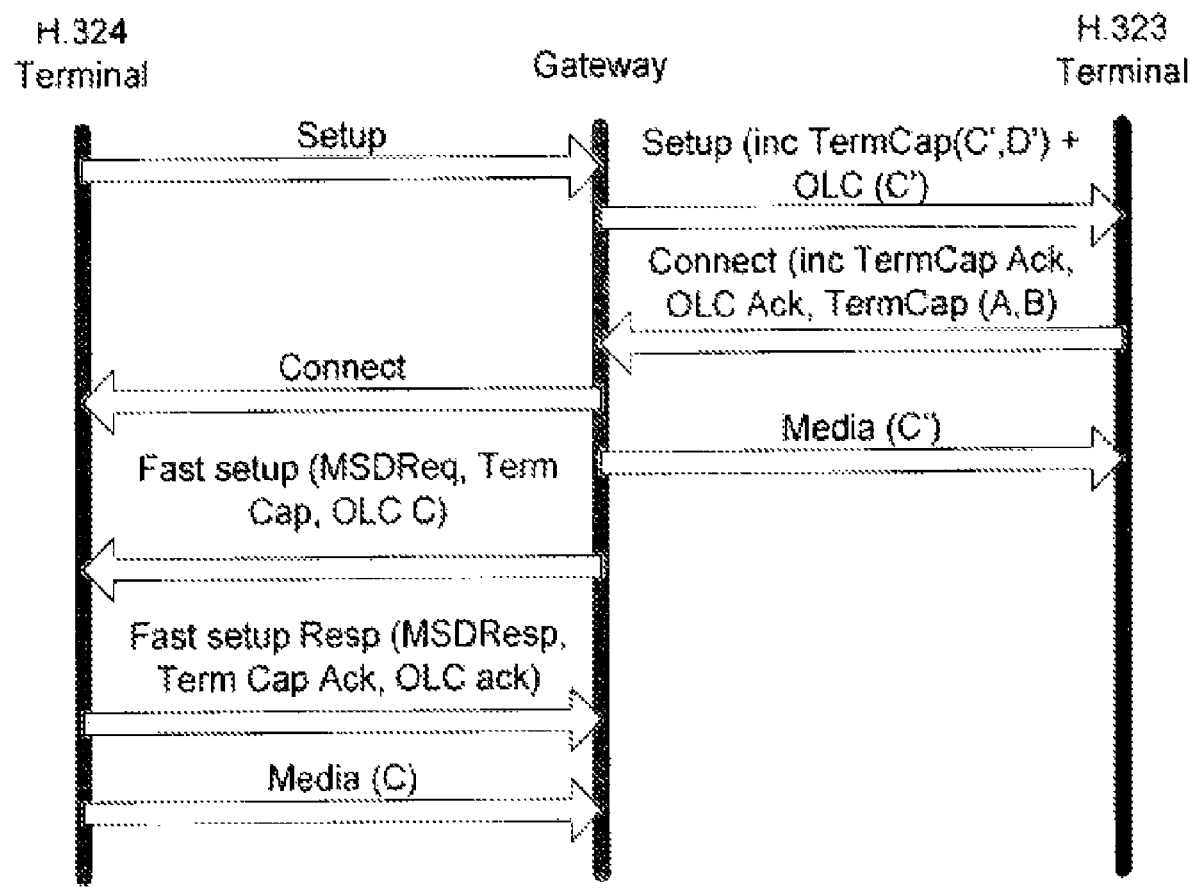
FIG. 13 is a simplified call flow illustrating call establishment from an H.324 device implementing an accelerated procedure through a gateway to an H.323 device implementing an accelerated procedure according to an embodiment of the present invention.

FIG. 13 is a simplified call flow illustrating call establishment from an H.324 device implementing an accelerated procedure through a gateway to an H.323 device implementing an accelerated procedure according to an embodiment of the present invention. As illustrated in FIG. 13, some embodiments of the present invention support H.324 fast setup to H.323 with fast connect. In these embodiments, the H.324 terminal support the "fast setup" extension and the call flow is illustrated in FIG. 13. This is the method described in relation to FIG. 12, but applied to the H.324 fast setup procedures described in U.S. Provisional Patent Application No. 60/433, 252, filed on Dec. 12, 2002.

Embodiments of the present invention provide a novel architecture for the Decoupled Gateway Session Signaling (DGSS) function of a Multimedia Gateway. The DGSS Architecture defines an Abstract Session Setup State Machine. This abstract state machine applies to a variety of multimedia networks and defines the session setup procedures in a general and widely applicable way. The DGSS architecture also defines a functional decomposition of the Gateway Session Signaling (GSS) function that includes a Session Handler, which is an embodiment of the Abstract Session Setup State Machine, Protocol Wrappers, and concrete protocol implementations. The interfaces between the Protocol Wrappers and the Session Handler are specified herein.

A characteristic of the Abstract Session State Machine is that it contains only a few well-defined points where the two call halves must be synchronized. This allows much of the work involved in session setup to be done in parallel by the concrete protocols and their associated Protocol Wrappers. The result is reduced coupling between call halves and decreased session setup time compared to a Full Proxy GSS implementation, described below.

Embodiments of the present invention described herein apply to H.324, H.324M, and 3G-324M and other systems that employ similar standards. Further, although some embodiments are described in the context of connecting such terminals to H.323, SIP, and RTSP terminals or services, the methods and systems can be applied to similar networks.

Due to the similarities that HTTP shares with RTSP (and SIP), session setup would follow the same flow. However, the buffering of the file retrieved from HTTP could additionally be performed at the gateway, or in a separate proxy or mediation entity. For depositing of HTTP files, the buffering and any additional processing, including transcoding and transizing can be completed at the gateway or a proxy or mediation device before posting/putting the file on the HTTP server. Note that transcoding, trans-sizing, trans-rating and other media adaptation can be performed in the context of HTTP on the fly and in real time without having to store the media in a temporary file.

The session handling method and apparatus described in this invention achieves a fast session setup completion by allowing either side of the session handler in a MMGW to proceed at its highest pace. Because a multimedia session involving terminating points using protocols such as 3G-324M, SIP, H.323, RTSP, and the like require some form of capability and media mode exchange procedures, embodiments of the invention include synchronization points that allow the session handler to synchronize the state of each leg of the call (each terminating end to the MMGW). The synchronization permits connected terminals to achieve proper timing of protocol procedures and media exchange for channels carrying stateful data (such as compressed video), so that a terminating end receives media when it is ready and no initial media is lost, which may lead to some unwanted artifacts common to video communication resulting from lost of key frames.

The session handling method divides the session establishment into the following phases separated by synchronization points:

Capability Exchange Phase;
Synchronization Point
Media Mode Selection
Synchronization Point
Media Exchange The synchronization points are programming devices within the session handler that allows it to wait until its procedures with each of the terminating endpoints to complete before the session handler proceeds to the next phase.

When providing MMGW functionality, there are some important design goals:
1. Call signaling and session signaling in the MMGW should occur as quickly as possible. Delays on the order of a few hundred milliseconds are generally tolerated by a human user, but setup times of many seconds or longer result in poor user experience and unnecessary waste of network resources.
2. The internal system architecture of the MMGW should be flexible enough so that multiple and simultaneous network interfaces can be supported.
3. The internal system architecture in the MMGW should be flexible enough so that additional network capabilities can be introduced over time as networks evolve or as new networks appear. In practice, there is usually a layer of abstract partitioning within the MMGW as well as well designed internal interfaces between the partitioned components.
4. Some of the data carried over channels is inherently 'stateful' and can result in poor performance or quality if the data is transmitted by one party before it is ready to be received by the other. In order to address this, the MMGW should be able to either manage the synchronization of the channel state between the two ends or manage the media itself so that the state is preserved.

Capability Exchange Phase

During this phase each terminating endpoint transmits its capabilities using its protocol procedures to the session handler. The capabilities may include which media format it supports. For example for video, the capabilities may include compression schemes, bit rates, frame rates, frame sizes. For audio, including voice, capabilities may include compression scheme, bit rate, pre/post processing features, silence detection, and the like. General data capabilities may also be included (e.g., fax, data sharing applications such as whiteboarding). This phase may also include additional procedures that are needed by the next phase (such as Master/Slave determination of the H.324 and H.323 system protocols, or multiplex capabilities of H.324).

The decoupling of the Capability Exchange allows each terminating endpoint to complete its exchange procedures as fast it can with the session handler. The capabilities transmitted by the session handler to each of the terminating endpoints correspond to those it can handle on each respective terminating end point. For example:

Mobile Terminal A supports H.263
Fixed Terminal/Server B supports MPEG4-video
The MMGW supports Mobile/H.263 to/from Fixed/MPEG4-video transcoding
In this case the session handler transmits the (possibly pared back) H.263 capabilities to Terminal A and MPEG4-video capabilities to Terminal/Server B.

The Synchronization Point at the end of this procedure allows the Capabilities Exchange and other procedures to complete between each terminating endpoint and the MMGW's session handler if needed and be in a position to proceed to the next phase.

Note that depending on the protocols used in either side of the MMGW, this synchronization point may or may not exist. That is, if a protocol on one side of the MMGW does not need to provide all the information needed to synchronize with the other side, then the MMGW may either hold the synchronization until the information is available or supply default information or information provided by a network element (e.g. database of service) instead.

Media Mode Selection

During this phase each terminal, based on its capabilities and that received from its peer (the MMGW's session handler), selects the media modes it intends to exchange and invokes the appropriate procedures to allow media exchange, including the opening of media channels and the definition of multiplex capabilities or the association of media channels with transport addresses and ports as required in the context of a packet based system protocols such as H.323, SIP and RTSP.

The Synchronization Point at the end of this phase allows the session handler and the terminating endpoints to complete their media mode selection and associated procedures as to be ready for media exchange.

Note that in the case of a content access services such as RTSP, the session connectivity issues and the synchronization points would be similar to SIP with the addition that in the context of RTSP, an explicit command such as PLAY is used to explicitly instruct the streaming server to start the media streaming.

Note that if the protocol or associated service (e.g. RTSP and streaming) on one side of the MMGW does not provide specific information for the media selection, then the MMGW may provide default information or supply information stored in a network element (e.g. database of service).

Media Exchange Phase

During this phase each terminal transmits its media to the MMGW which transforms it appropriately as to be conformant and understandable by the other terminal.

It is not always required to delay the transmission of media from either endpoint to the gateway up until synchronization point, even for stateful media. The media gateway could in fact be receiving media from one terminal prior to the determination that the other terminal is capable of receiving the media. Typically, if the limit is not maintained and media is simply passed through the media gateway prior to the synchronization point, there is substantial degradation of the media, as well as possible media synchronization/skew issues. However, if the gateway is capable of creating the stateful aspect of a media stream dynamically (i.e., producing an output intra coded frame from an inter coded frame), then the synchronization point can cause this feature generation and then media transmission can continue. This allows a faster setup time, as there is no need to wait for the further synchronization and media flow to propagate to the terminal and back. Instead, media is available immediately from the gateway which reduces overall session setup time. Further discussion of the dynamic generation feature is found in U.S. patent application Ser. No. 10/762,829, filed on Jan. 21, 2004, and entitled "Method And Apparatus for Handling Video Communications Errors," the disclosure of which is incorporated herein in its entirety for all purposes. Moreover, additional description of the dynamic generation feature is found in U.S. patent application Ser. No. 11/496,058, filed on Jul. 28, 2006, and entitled "Method and Apparatus for Providing Interactive Media During Communication in Channel-Based Media Telecommunication Protocols," the disclosure of which is incorporated herein in its entirety for all purposes. This feature is also useful for protocols that allow media transmission before negotiation in an attempt to speed up session setup, such as H.320 or SIP early media or the media transmission features described in U.S. patent application Ser. No. 10/934,077, filed on Sep. 3, 2004, and entitled "Methods And System For Fast Session Establishment Between Equipment Using H.324 And Related Telecommunications Protocols" and U.S. patent application Ser. No. 11/303,858, filed on Dec. 15, 2005, and entitled "Fast Session Setup Extensions to H.324," the disclosure of which is incorporated herein in its entirety for all purposes. In these cases, media cannot necessarily be delayed until it can be synchronized end to end but the feature allows reception of the media and dynamic generation of the features when the far end point is capable of receiving them allowing the fastest possible setup time.

Note that the phases describe above can be repeated. For example if the terminals close their media channels, they can repeat the media mode selection phase to select different media configurations. When the phases are repeated, the session handler will use synchronization to ensure proper readiness of terminals to be in the next phase (e.g. media exchange).

Embodiments of the present invention as described above and throughout the present specification are also applicable to other protocols that could be in use on either side of the gateway, regardless of whether they are circuit switched based or packet switched based. Embodiments provide principles to allow the session protocols on either side of the gateway to proceed as fast and as far as they can and to meet at synchronization points where a protocol on one side of the gateway needs to ensure that the other protocol has completed the procedures needed before moving to the next phase of the session establishment. Hence embodiments of the invention are applicable to all protocols that involve the establishment of a multimedia session that could involve exchange of video, audio, data, including messages such chat text messages. One of ordinary skill in the art would recognize many variations, modifications, and alternatives.

An example embodiment of the invention is described below. The embodiment architecture contains several discrete components:

1. The Session Handler, which implements the Abstract Session State Machine and contains interfaces to the Call Signaling, the Protocol Wrappers and the Media Gateway resources.
2. For each concrete protocol that is to be supported by the MMGW (e.g., 3G-324M, but also including other protocols as described above), a software implementation of that protocol is required. A custom Protocol Wrapper is required for each concrete protocol that mediates between the interfaces provided by the concrete protocol and the Session Handler, according to its specified interfaces.

Functional Decomposition of Decoupled Gateway Session Signaling

Figure 15:
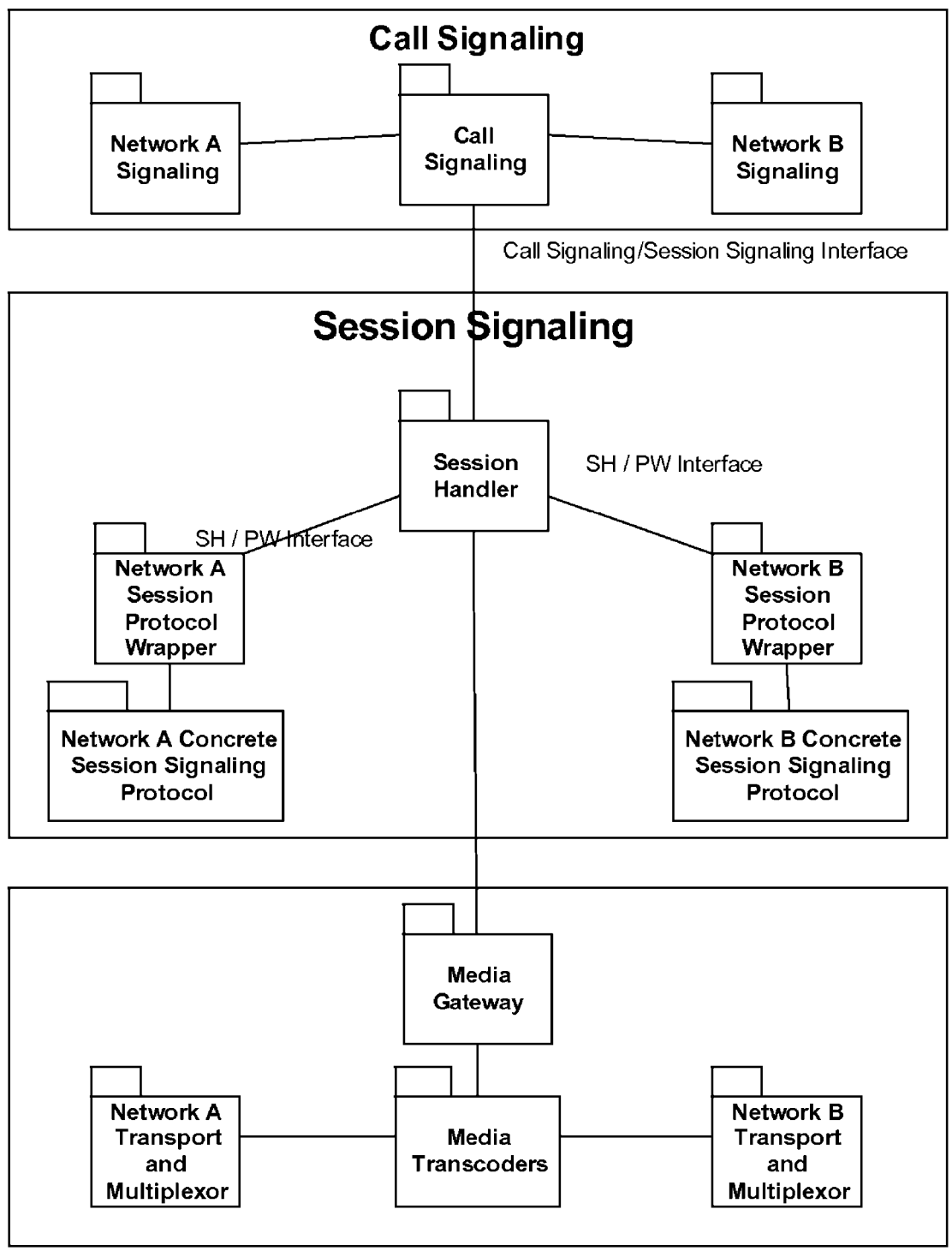
FIG. 15 illustrates components of a Decoupled Gateway Session Signaling Architecture according to an embodiment of the present invention.

FIG. 15 illustrates components of a Decoupled Gateway Session Signaling Architecture according to an embodiment of the present invention. These components include a Session Handler, Protocol Wrappers, and Interfaces. Embodiments of the present invention are not limited to the components illustrated in FIG. 15, but may include additional or fewer components as appropriate to the particular application.

At the core of the Decoupled Session Gateway Signaling Architecture is a Session Handler. The Session Handler has interfaces to the Call Signaling, the Protocol Wrappers, and the media processing system, which is typically called the Media Gateway. FIG. 15 depicts the relationship of these entities when engaged in a single call from Network A to Network B. Note that both Network A and Network B may have network-specific requirements and protocols for call signaling, session signaling, and media transport and multiplexing.

The Protocol Wrappers convert protocol specific messages from the actual protocol into protocol-independent messages relevant to the Session Setup State Machine implemented by the Session Handler. The Protocol Wrappers provide a uniform and protocol-independent interface to each of the concrete protocol implementation supported by the MMGW. A specific Protocol Wrapper is required for each concrete protocol that needs to be supported. Variant Protocol Wrappers may also be used to accommodate different actual protocol implementations or implementation environments. The protocol-independent representation is an internal representation that is used to represent messages, states, and procedures in a fashion independent of a specific standard protocol.

In the simplest case, the Call Signaling entity in the Media Gateway Controller does not concern itself with session signaling. All session signaling is performed by the Session Handler. This is the normal ("normal start") case. Some protocols, such as H.323 and H.324 AnswerFast Type III terminals (AFIII), provide for mechanisms where session negotiation is either partly or completely completed as part of Call Signaling. These are denoted are denoted here as "fast start" or "early capabilities" cases.

A further "fast start" mechanism supported by the present invention is the AnswerFast Type IV preference messages transmitted immediately on bearer establishment. These can take the form of preferences, capabilities and even media.

Message Flows During Call Establishment

Figure 16:
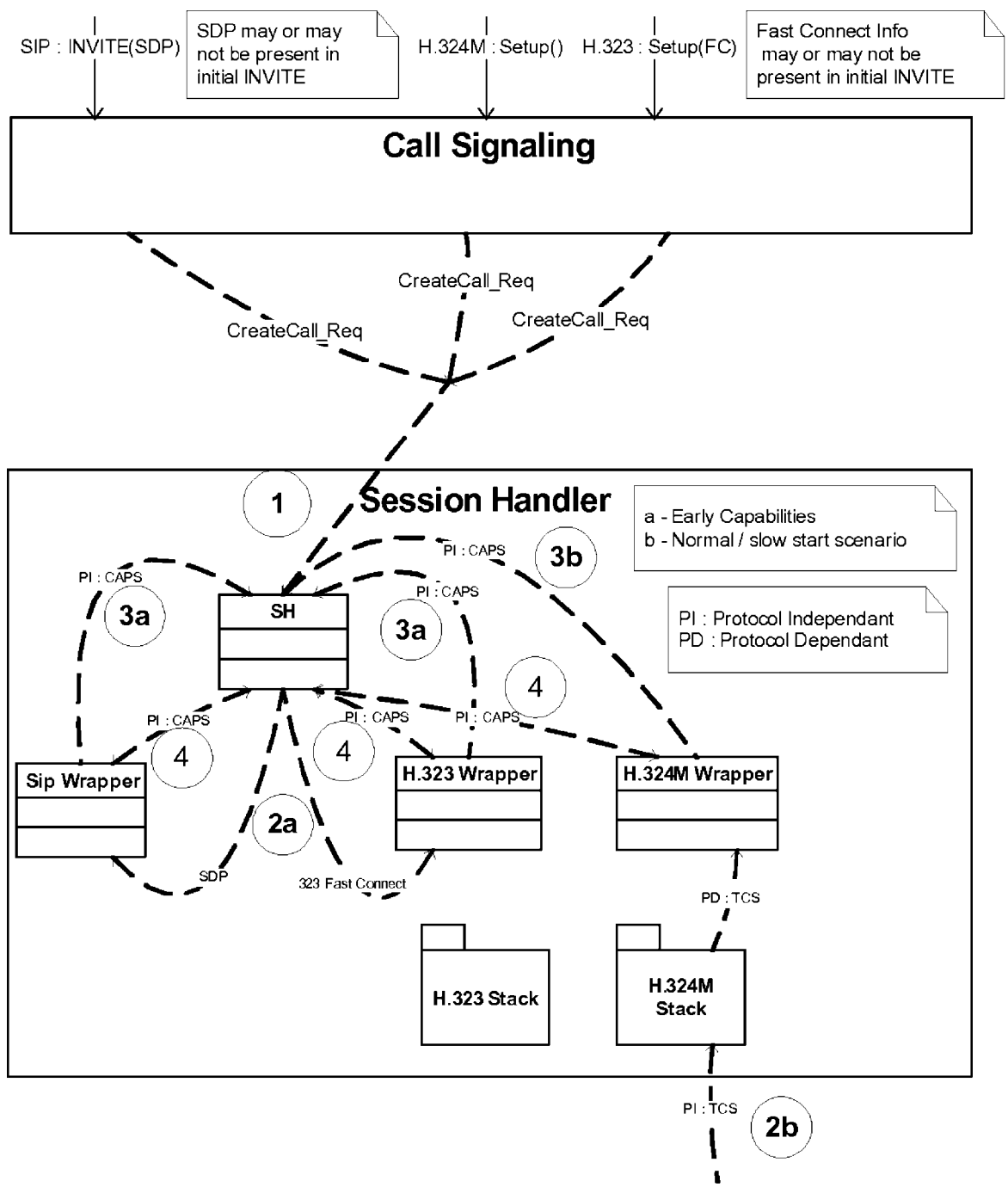
FIG. 16 illustrates message flows between various components of a gateway during call establishment in some embodiments of the present invention.

FIG. 16 illustrates message flows between various components of a gateway during call establishment in some embodiments of the present invention.

When a new call arrives, the Call Signaling entity sends a message to the Session Handler. The first message to the Session Handler (FIG. 16/Reference Point 1) is a CreateCall_Req message.

The Session Handler initializes an internal state for this new call, and then uses the incoming and outgoing call type to determine which protocols are to be used, and notifies the appropriate Protocol Wrappers to establish a new call.

Normal Start Call Signaling

The Session Handler then waits for the Protocol Wrappers to return the result of their media option negotiation. It is the job of the Protocol Wrappers and Concrete Session Protocol implementations to negotiate an acceptable set of media options with their respective endpoints. Typically the Protocol Wrappers do not offer their media options, but instead wait for the endpoints to offer their media options first. This negotiation may involve many separate messages by the concrete protocols, depending upon protocol. See FIG. 16/Reference Point 2b. When this phase has been completed by a call leg, its Protocol Wrapper reports the results by a MediaOptions_Ind message (FIG. 16/Reference Point 3b).

Fast Start and Early Capabilities

In some cases, it is possible to receive capabilities and session preferences from the signaling layer. H.323 has Fast-Connect procedures which provide a way of tunneling an initial set of offered media options in the call signaling messages. Similarly, when using SIP, the media capabilities normally arrive in the form of a Session Description Protocol (SDP), or a variation of SDP (SDP-like), message attachment with the initial INVITE message. In both cases, the offered media options are tunneled through the call signaling layer through the Session Handler.

Note that although the Session Handler does not normally offer up initial media capabilities (and insists instead that the endpoints to offer theirs first), there are a number of cases where this is not practical. In Fast Start & Early Capabilities, it may be necessary in some cases to offer capabilities to the other endpoint as part of Call Signaling. An initial set of options may be determined in a wide variety of ways, including provisioning a default set. Whether this happens, or not, is immaterial, as long as the tunneled options are provided to the Session Handler at the CreateCall_Req message.

In all cases of Fast Start & Early Capabilities, the media options are essentially pre-negotiated, and are provided to the Session Handler in the initial CreateCall_Req. The Session Handler, in turn, provides this information to the Protocol Wrappers (FIG. 16/Reference Point 2a). Because the information about offered media options has already been determined, the Protocol Wrappers are not required to perform any session signaling. They simply parse the payload of these messages and immediately reply to the Session Handler with the MediaOptions_Ind message (FIG. 16/Reference Point 3a).

Media Options Synchronization Point

Once the Session Handler has received the offered media capabilities, it determines an acceptable combination of options that can be provided by the Media Gateway. For example, a mobile endpoint might offer MPEG4-video as its preferred video codec, and a packet client might offer H.263. The Media Gateway can only accept this call if it can perform MPEG4-video to/from H.263 transcoding. Of course, if an agreeable set of media options cannot be negotiated with either endpoint, the decision of how to proceed is context specific.

At this point, the Session Handler may need to reserve resources within the MMGW (and in particular, within the Media Gateway) to support the call.

Following this stage a message is sent to each Protocol Wrapper (FIG. 16/Reference Point 4) to specify which of the options are actually chosen, and this notifies the Protocol Wrappers to continue with the call and to allow the establishment of the media channels. The Session Handler then enters the Session Ready state and logical channels may be opened.

The Protocol Wrappers then immediately attempt to open the logical channels associated with the call.

Opening Logical Channels

The Session Handler then instructs the Protocol Wrappers to open each of the negotiated logical channels. Logical channels are opened independently, and fall into two main categories: those that require synchronization for proper operation and those that do not. When the Protocol Wrappers indicate to the Session Handler that the transmitter for one logical channel is ready and the receiver for that logical channel is likewise ready, the Session Handler enables the Media Gateway to start the flow of media for that channel.

Waiting for the transmitter and receiver for the logical channels to open represents the second synchronization point for the call (more precisely, the second final set of 'Media Channel Ready' synchronization points, as multiple unidirectional channels are typically opened). In the general case it is possible to handle channels that do not require synchronization without a new synchronization point between the protocol wrappers and simply synchronize the call on channels which do carry 'stateful' data.

Figure 17:
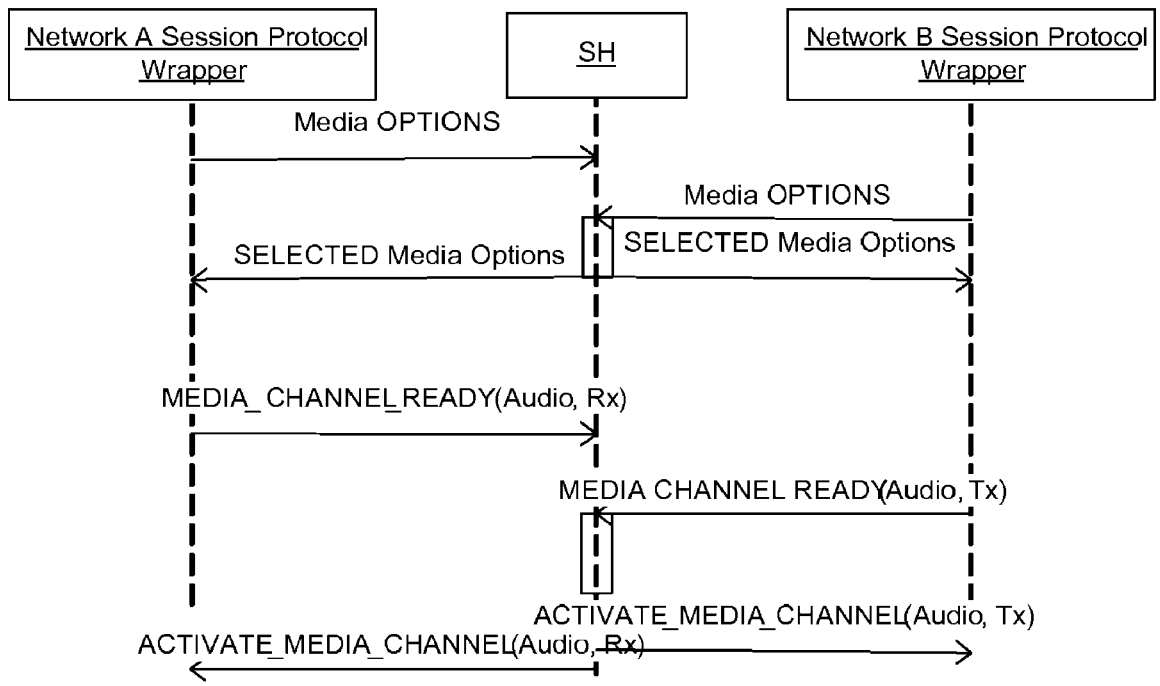
FIG. 17 is a simplified diagram of messaging flow between components in a gateway illustrating media activation in a media gateway according to an embodiment of the present invention.

FIG. 17 is a simplified diagram of messaging flow between components in a gateway illustrating media activation in a media gateway according to an embodiment of the present invention. FIG. 17 illustrates a protocol "ladder diagram" between the Session Protocol Wrappers and the Session Handler according to an embodiment of the present invention. FIG. 17 illustrates both the "media options wait" synchronization point, and the "media channel ready" synchronization point for a single unidirectional logical channel.

The flow shown in FIG. 17 can be mapped onto the external protocol behavior of the gateway, and can be explained with reference to FIG. 3 and FIG. 5. The media options are the internal gateway representation of the capability messages received at the gateway, in the form of TCS(C,D) or TCS(A,B)/SDP(A,B) in the referenced figures. These capability messages are then processed, and possibly pared back to a selected subset. The selected media options are transmitted to protocol wrappers and eventually are transmitted to end devices in the TCS(C) and TCS(A)/SDP(A) capability messages.

The session handler receives an indication from the left hand protocol wrapper associated endpoint has changed state to be able to receive media. This could be, for example, in the form of an OLC (or an OLC Ack). The session handler also receives an indication that the right hand terminal has changed state to be able to transmit. This could be in the form, for example, of an OLC (or an OLC Ack). The session handler then recognizes that it can allow for the session media to be cross transmitted and sends media activation events accordingly. This allows the transmitter to transmit the media and the gateway to copy through, or process the media and then transmit, with media synchronized and no concern on corruption. Note that as shown in the figure, the session handler operates from the gateway's perspective so the indication of an Rx is the gateway's protocol handler indicating it may receive media.

Figure 14:
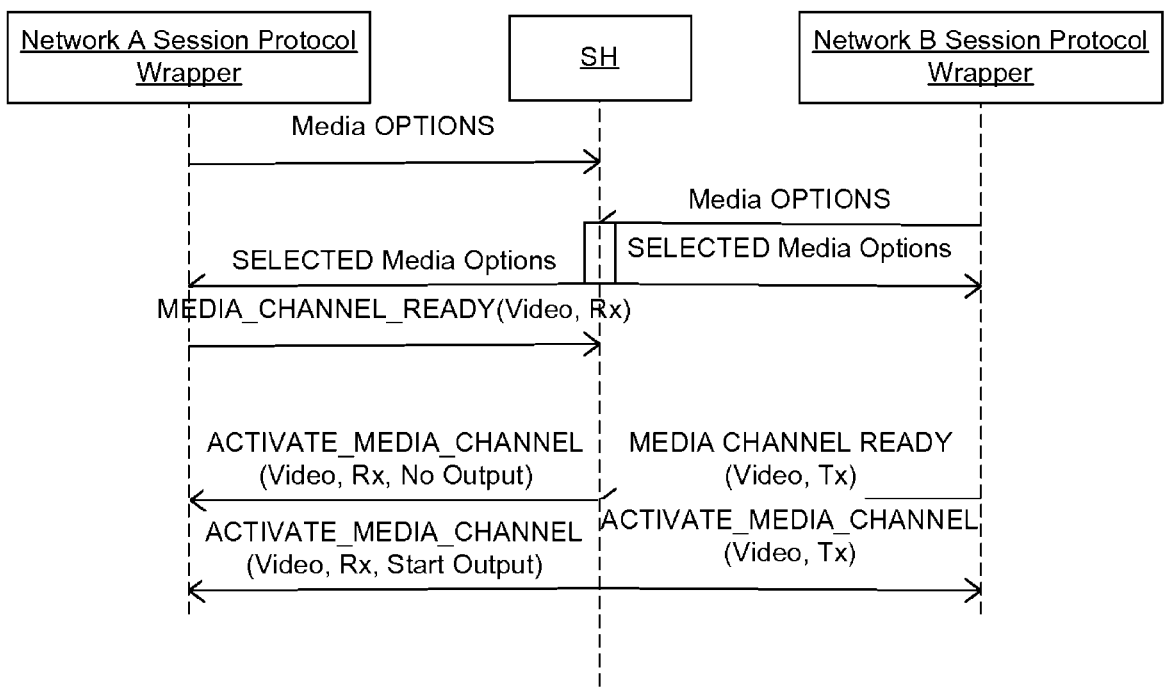
FIG. 14 is a simplified diagram of messaging flow between components in a gateway illustrating media activation in a media gateway supporting a dynamic generation feature according to an embodiment of the present invention.

FIG. 14 is a simplified messaging flow between components in a gateway illustrating media activation in a media gateway supporting dynamic generation feature according to an embodiment of the present invention. As described with relation to FIG. 17, FIG. 14 relaxes the constraint on the protocol wrappers in a way that corresponds with the change from FIG. 3 to FIG. 7, with the introduction of the local generation feature. This may introduce a new message, or sub message, into the system that allows for a transcoder to operate in a decode only fashion where the media state is tracked and kept satisfactorily for a media refresh point transmission on demand, but no media is transmitted until an indication is received that the receiving terminal is ready to receive media. This corresponds to the "no output" and "start output" sub messages.

An indication is received at the session handler that the negotiations have created a media channel that is capable of receiving media on at the gateway. Instead of holding off the activation message, associated most likely with an OLC Ack or SIP Ack, the activation occurs and the associated media path, probably a transcoder is put into a no output state. The state remains in the "no output" state, possibly receiving media and decoding or buffering or otherwise preparing for a media recovery action until a message comes in from a separate protocol wrapper that the remote device is now capable of receiving media. The session handler can then activate the protocol wrapper associated with the receiving external terminal and allow for transmission to "start output" and achieve a faster call setup than possible with the synchronization method described in relation to FIG. 17.

Figure 18:
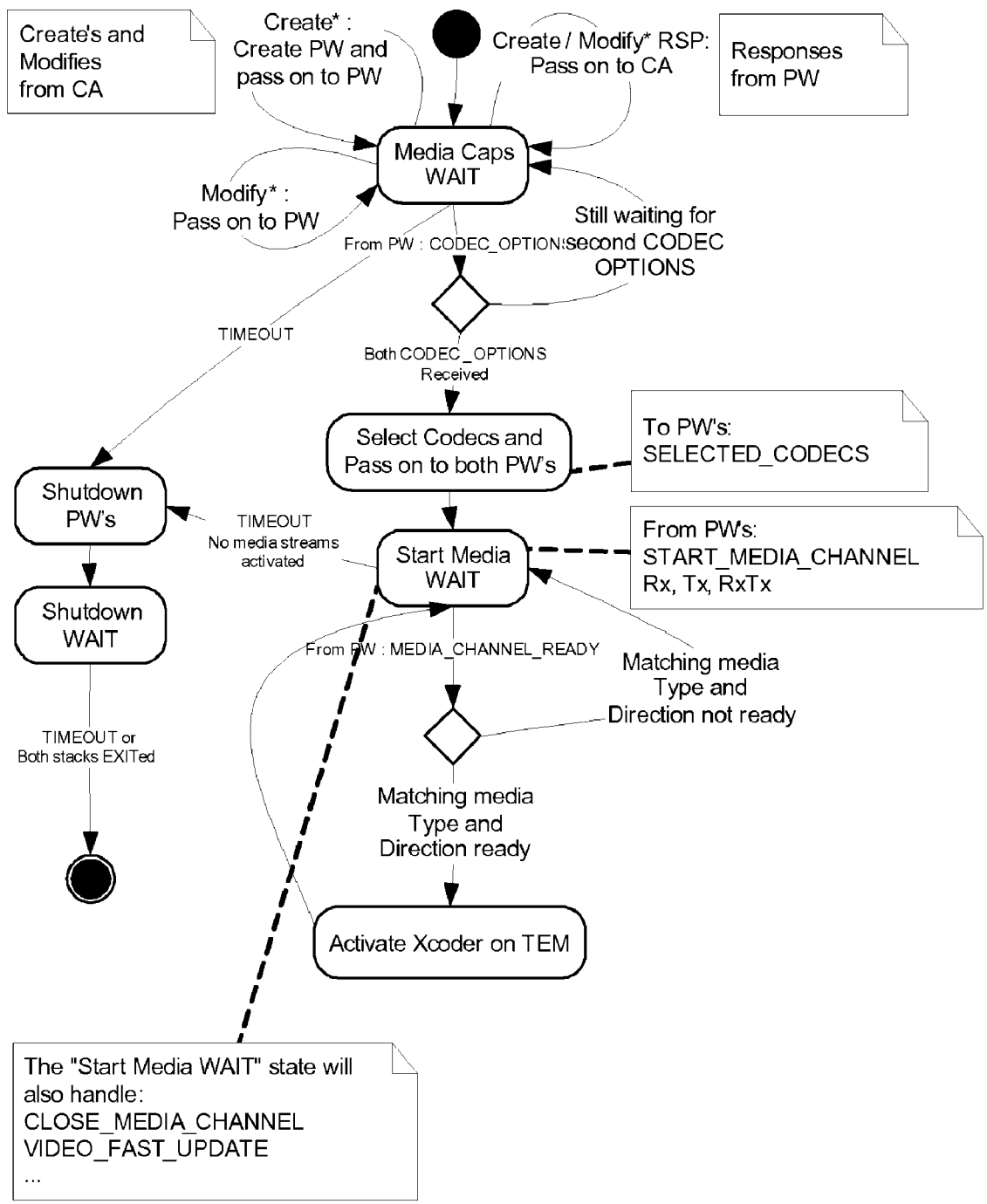
FIG. 18 illustrates how a state machine can control the establishment of a session in a gateway with synchronization points according to an embodiment of the present invention.

FIG. 18 illustrates how a state machine can control the establishment of a session with synchronization points according to an embodiment of the present invention. The "media channel ready" synchronization point need not be a limitation on the transmission of stateful media if a media recover mechanism and in particular if a dynamic generation feature is present at the gateway.

Messages

Table 2 shows example messages used by the session establishment handler, together with their description.

TABLE 2

| From Cell Agent to Session Handler | |
|---|---|
| CreateCall_Req | Used to establish a new call. This message can carry media and terminal capabilities. |
| ModifyCall_Req | Used to modify the context of a call. Can carry media and terminal capabilities, or out of band information (e.g., 323 UII messages or SIP INTO messages) |
| DeletCall_Req | Used to terminate a call. |
| From Session Handler to Call Agent | |
| CreateCall_Cfm | Confirms a create request. |
| ModifyCall_Cfm | Confirms a modify request. |
| ModifyCall_Ind | Can be used to carry out of band information (e.g., cause the Call Agent to forward a 323 UII message, or to create a SIP INFO message). |
| DeleteCall_Cfm | Confirms the termination of a call. |
| From Stack to Protocol Wrapper: Protocol Specific | |
| Terminal_Capabilities_Inc | Capabilities of remote endpoint. |
| Start_Media_Channel_Ind | Media channel is established. Contains media type and direction: Rx, Tx or RxTx for bi-directional channels. |
| Close_Logical channel_Ind | Logical channel has closed. |
| Video_Fast_Update_Ind | Video fast update request received from endpoint. |
| From Protocol Wrapper to Stack: Protocol Specific | |
| Terminal_Capabilities_Req | Capabilities of local stack to send to remote |
| Open_Logical_Channel_Req | Open logical channel |
| Close_Logical_Channel_Req | Close logical channel |
| Video_Fast_Update_Req | Send out Video fast update (possibly not required) |
| Protocol Wrapper to Session Handler: Protocol Independent | |
| MediaOptions_Ind | Contains the codec options of the endpoints. This data structure will be the same generic representation as used by the stacks for media capabilities. This will require a conversion from SDP in the case of SIP. |
| Media_Channel_Ready_Ind | Indicates that a media channel is ready. Contains: Media type (Audio, Video) and Direction: Rx, Tx, RxTx |
| Session Handler to Protocol Wrapper: Protocol Independent | |
| Selected_Codecs_Req | Selected Media Capabilities to pass on to endpoint |

Example Call Flow

Figure 19:
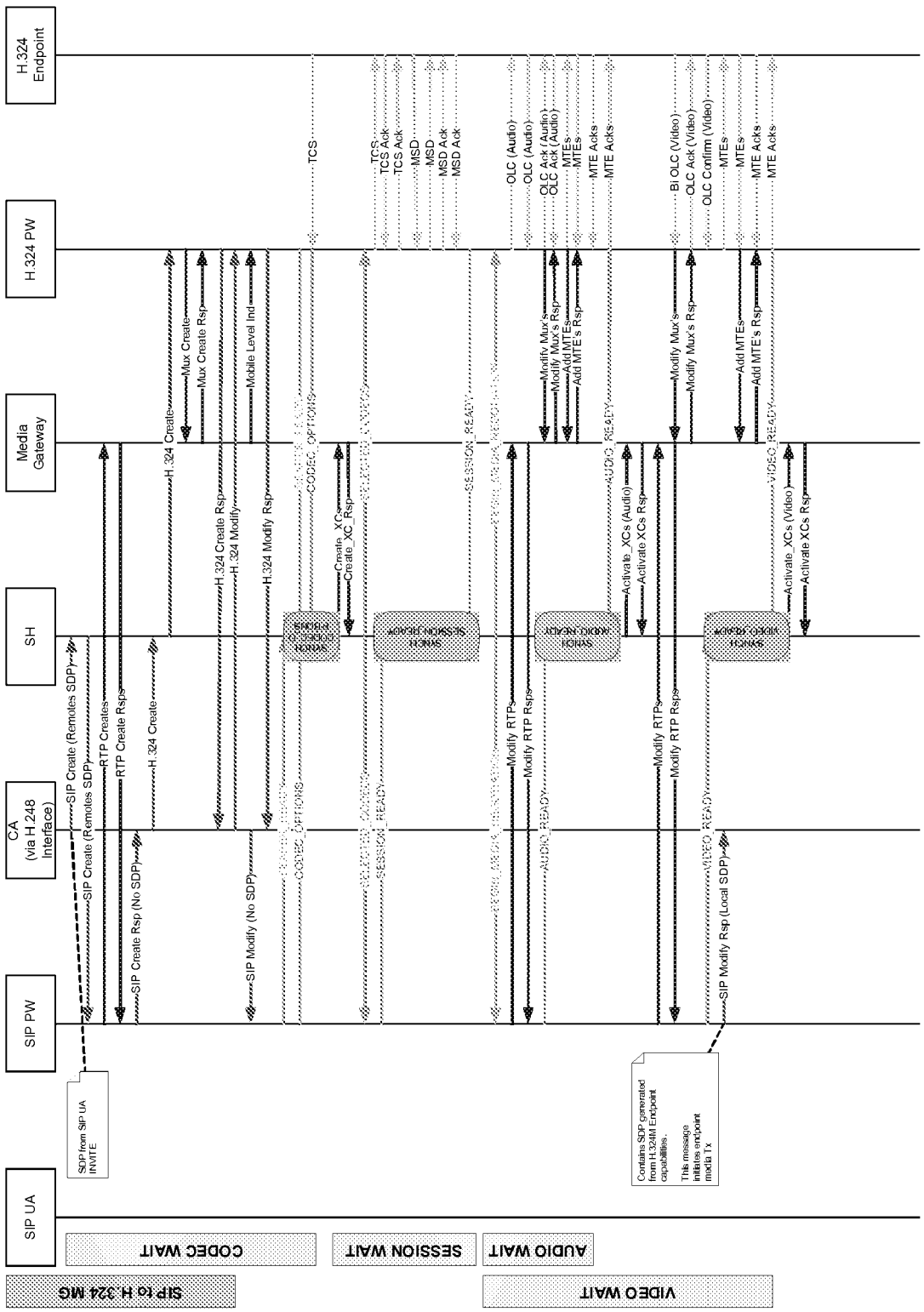
FIG. 19 is a messaging flow between components in a gateway illustrating session setup between an H.324-like terminal and a SIP-like terminal in a media gateway according to an embodiment of the present invention.

FIG. 19 is a messaging flow between components in a gateway illustrating session setup between an H.324-like terminal and a SIP-like terminal in a media gateway according to an embodiment of the present invention. FIG. 19 shows a call flow that includes the session signaling with the synchronization points between a 3G-324M/H.324 terminal and a SIP User Agent. Note a SIP User Agent can be the SIP protocol entity in a terminal or a server. This figure shows some of the pertinent interactions between the components in a decoupled gateway and the SIP user agent and the H.324 terminal.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A method of establishing a reduced setup time session between a first SIP-like terminal and a second SIP-like terminal, the session being conducted between the first SIP-like terminal and the second SIP-like terminal through a gateway, the method comprising:
receiving a first call setup message transmitted from the first SIP-like terminal to the gateway, wherein the first call setup message includes a first capability message;
transmitting a second call setup message from the gateway to the second SIP-like terminal;
receiving a second capability message transmitted from the second SIP-like terminal to the gateway;
transmitting a first capability response message from the gateway to the first SIP-like terminal;
transmitting a second capability response message from the gateway to the second SIP-like terminal;
receiving a media stream transmitted from the second SIP-like terminal to the gateway;
processing media stream, wherein processing the media stream comprises identifying a temporal feature in the media stream that enables a decoder to establish a decoder refresh point;
receiving an acknowledgment message transmitted from the first SIP-like terminal to the gateway, wherein the acknowledgement message is received at the gateway after transmitting the second capability response message; and
thereafter, transmitting the processed media stream from the gateway to the first SIP-like terminal.

2. The method of claim 1 wherein the first capability message comprises an SDP-like message.

3. The method of claim 1 wherein the second call setup message includes a second capability message.

4. The method of claim 1 wherein the second call setup message comprises an empty INVITE.

5. The method of claim 1 further comprising:
receiving a second media stream transmitted from the first SIP-like terminal to the gateway; and
transmitting the second media stream from the gateway to the second SIP-like terminal.

6. The method of claim 1 wherein transmitting the first capability response message to the first SIP-like terminal is performed after receiving the second capability message transmitted from the second SIP-like terminal to the gateway.

7. The method of claim 1 wherein a number of video capabilities in the first capability response message is less than a number of video capabilities in the first capability message.

8. The method of claim 7 wherein the number of video capabilities in the first capability response message is one.

9. The method of claim 1 wherein a number of audio capabilities in the first capability response message is less than a number of audio capabilities in the first capability message.

10. The method of claim 9 wherein the number of audio capabilities in the first capability response message is one.

11. The method of claim 1 wherein the temporal feature comprises an intra-coded frame.

12. The method of claim 1 further comprising generating a VideoFastUpdate-like message and transmitting the VideoFastUpdate-like message from the gateway to the second terminal.

13. The method of claim 1 wherein processing further comprises generating an intra-coded frame.

14. The method of claim 13 wherein generating the intra-coded frame comprises converting an inter-coded frame into an intra-coded frame.

15. The method of claim 1 wherein receiving an acknowledgment message transmitted from the first SIP-like terminal to the gateway is performed independent of receiving the media stream transmitted from the second SIP-like terminal to the gateway.

16. A method of establishing a reduced setup time session between a first SIP-like terminal and a second SIP-like terminal, the session being conducted through a gateway, the method comprising:
performing a first session setup process between the first terminal and the gateway, wherein performing the first session setup process comprises:
receiving a first INVITE message transmitted from the first SIP-like terminal to the gateway, wherein the first INVITE message includes a first capabilities message;
processing the first capabilities message;
transmitting a first capabilities response message from the gateway to the first SIP-like terminal; and
receiving an acknowledgment message transmitted from the first SIP-like terminal to the gateway;
performing a second session setup process between the second terminal and the gateway, the second session setup process being performed independent of the first session setup process;
receiving a media stream transmitted from the second SIP-like terminal to the gateway;
processing the media stream;
providing an intra-coded frame; and
thereafter, transmitting the intra-coded frame and the processed media stream from the gateway to the first SIP-like terminal.

17. The method of claim 16 further comprising:
receiving a second media stream transmitted from the first SIP-like terminal to the gateway; and
transmitting the second media stream from the gateway to the second SIP-like terminal.

18. The method of claim 16 wherein a number of video capabilities in the first capability response message is less than a number of video capabilities in the first capability message.

19. The method of claim 18 wherein the number of video capabilities in the first capability response message is one.

20. The method of claim 16 wherein a number of audio capabilities in the first capability response message is less than a number of audio capabilities in the first capability message.

21. The method of claim 20 wherein the number of audio capabilities in the first capability response message is one.

22. A method of establishing a reduced setup time session between a first SIP-like terminal and a second SIP-like terminal, the session being conducted through a gateway, the method comprising:
performing a first session setup process between the first terminal and the gateway;
performing a second session setup process between the second terminal and the gateway, the second session setup process being performed independent of the first session setup process wherein performing the second session setup process comprises:
transmitting a second INVITE message from the gateway to the second SIP-like terminal;
receiving a second capabilities response message transmitted from the second SIP-like terminal to the gateway;
processing the second capabilities response message; and
transmitting an acknowledgement message from the gateway to the second SIP-like terminal;
receiving a media stream transmitted from the second SIP-like terminal to the gateway;
processing the media stream;
providing an intra-coded frame; and
thereafter, transmitting the intra-coded frame and the processed media stream from the gateway to the first SIP-like terminal.

23. The method of claim 22 wherein the second INVITE message comprises an empty INVITE message.

24. The method of claim 22 wherein the acknowledgment message includes an SDP-like message.

25. The method of claim 24 wherein a number of video capabilities in the SDP-like message is less than a number of video capabilities in the second capability response message.

26. The method of claim 25 wherein the number of video capabilities in the SDP-like message is one.

27. The method of claim 24 wherein a number of audio capabilities in the SDP-like message is less than a number of audio capabilities in the second capability response message.

28. The method of claim 27 wherein the number of audio capabilities in the SDP-like message is one.

29. The method of claim 16 wherein processing the media stream comprises identifying a temporal feature in the media stream that enables a decoder to establish a decoder refresh point.

30. The method of claim 29 wherein the temporal feature comprises an intra-coded frame.

31. The method of claim 29 further comprising generating a VideoFastUpdate-like message and transmitting the VideoFastUpdate-like message from the gateway to the second terminal.

32. The method of claim 16 wherein processing the media stream further comprises generating an intra-coded frame.

33. The method of claim 32 wherein generating the intra-coded frame comprises converting an inter-coded frame into an intra-coded frame.

* * * * *